US011950121B2

(12) United States Patent
Wang et al.

(10) Patent No.: US 11,950,121 B2
(45) Date of Patent: Apr. 2, 2024

(54) TECHNIQUES FOR BEAM MEASUREMENT REPORTING

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/333,590

(22) Filed: May 28, 2021

(65) Prior Publication Data

US 2022/0386158 A1 Dec. 1, 2022

(51) Int. Cl.
*H04L 12/26* (2006.01)
*H04W 24/08* (2009.01)
*H04W 24/10* (2009.01)
*H04W 72/20* (2023.01)
*H04W 72/044* (2023.01)

(52) U.S. Cl.
CPC .......... *H04W 24/10* (2013.01); *H04W 24/08* (2013.01); *H04W 72/20* (2023.01); *H04W 72/046* (2013.01)

(58) Field of Classification Search
CPC . H04W 24/10; H04W 24/08; H04W 72/0406; H04W 72/046
USPC ...................... 370/252, 310.2, 328–330, 338
See application file for complete search history.

(56) References Cited

U.S. PATENT DOCUMENTS

| 2019/0387441 | A1  | 12/2019 | Koskela et al. |            |
|--------------|-----|---------|----------------|------------|
| 2020/0029386 | A1* | 1/2020  | Nam            | H04W 52/0229 |
| 2020/0252990 | A1  | 8/2020  | Ganesan et al. |            |
| 2021/0050888 | A1* | 2/2021  | Manolakos      | H04B 7/088 |
| 2021/0100059 | A1* | 4/2021  | Xu             | H04L 5/0048 |
| 2021/0105055 | A1* | 4/2021  | Chae           | H04L 1/0026 |

(Continued)

FOREIGN PATENT DOCUMENTS

| WO | WO-2018085144 A1 * | 5/2018 | ............ H04W 24/08 |
| WO | WO-2021034691 A1 * | 2/2021 | ............ H04B 7/0417 |
| WO | WO-2021096977 A1   | 5/2021 | |

OTHER PUBLICATIONS

International Search Report and Written Opinion—PCT/US2022/027689—ISA/EPO—dated Aug. 8, 2022.

*Primary Examiner* — Thai D Hoang
(74) *Attorney, Agent, or Firm* — Holland & Hart LLP/QUALCOMM Incorporated

(57) ABSTRACT

Methods, systems, and devices for wireless communication are described. A communication device, such as a user equipment (UE) may receive control signaling indicating a sidelink beam reporting resource configuration. The UE may receive a set of reference beams from a second device (e.g., another UE) over a sidelink. In some examples, the UE may perform a set of beam measurements based on a beam measurement occasion during at least one of a time period before an active duration. The UE may transmit a beam measurement report to the second device in accordance with the sidelink beam reporting resource configuration. The beam measurement report being transmitted during at least one of a time period before the active duration, a time period during the active duration, or a combination thereof. The beam measurement report may be based on the set of beam measurements associated with the set of reference beams.

36 Claims, 19 Drawing Sheets

(56) References Cited

U.S. PATENT DOCUMENTS

| | | | |
|---|---|---|---|
| 2021/0297959 A1* | 9/2021 | Zhou | ............... H04W 72/23 |
| 2022/0256386 A1* | 8/2022 | Kimba Dit Adamou | ............... H04L 5/00 |
| 2022/0321240 A1* | 10/2022 | Zhang | ............... H04B 17/318 |
| 2022/0385349 A1 | 12/2022 | Wang | |

* cited by examiner

TECHNIQUES FOR BEAM MEASUREMENT REPORTING

INTRODUCTION

The following relates to wireless communication, including managing beam measurement reporting associated with the wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include receiving control signaling indicating a sidelink beam reporting resource configuration, receiving a set of reference beams from a second device over a sidelink, and transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

An apparatus for wireless communication at a first device is described. The apparatus may include a processor, memory coupled to the processor, the processor and memory configured to receive control signaling indicating a sidelink beam reporting resource configuration, receive a set of reference beams from a second device over a sidelink, and transmit a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

Another apparatus for wireless communication at a first device is described. The apparatus may include means for receiving control signaling indicating a sidelink beam reporting resource configuration, means for receiving a set of reference beams from a second device over a sidelink, and means for transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

A non-transitory computer-readable medium storing code for wireless communication at a first device is described. The code may include instructions executable by a processor to receive control signaling indicating a sidelink beam reporting resource configuration, receive a set of reference beams from a second device over a sidelink, and transmit a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

Some examples of the method, apparatuses, and non-transitory computer-readable medium described herein may further include operations, features, means, or instructions for determining a set of sidelink resources based on the sidelink beam reporting resource configuration and transmitting the beam measurement report to the second device on the set of sidelink resources.

Some examples of the method, apparatuses, and non-transitory computer-readable medium described herein may further include operations, features, means, or instructions for performing the set of beam measurements based on a beam measurement occasion during at least one of the time period before the active duration and transmitting, in response to the set of beam measurements, the beam measurement report to the second device based on a beam report occasion during at least one of the time period before the active duration.

In some examples of the method, apparatuses, and non-transitory computer-readable medium described herein, the beam measurement occasion and the beam report occasion may be contiguous in a time domain.

In some examples of the method, apparatuses, and non-transitory computer-readable medium described herein, the beam measurement occasion and the beam report occasion may be noncontiguous in a time domain.

In some examples of the method, apparatuses, and non-transitory computer-readable medium described herein, one or more of a beam measurement occasion or a beam report occasion occur during at least one of the time period before the active duration, the time period during the active duration, or a combination thereof.

Some examples of the method, apparatuses, and non-transitory computer-readable medium described herein may further include operations, features, means, or instructions for grouping a set of beam measurement reports associated with a set of devices including one or more of the first device or the second device, generating the beam measurement report based on the grouping of the set of beam measurement reports associated with the set of devices, and transmitting the beam measurement report to the set of devices over the sidelink based on a beam report occasion during at least one of the time period before the active duration, the time period during the active duration, or a combination thereof.

Some examples of the method, apparatuses, and non-transitory computer-readable medium described herein may further include operations, features, means, or instructions for transmitting a set of beam measurement reports associated with a set of devices including one or more of the first device or the second device over the sidelink based on a set of beam report occasions during at least one of the time period before the active duration, the time period during the active duration, or a combination thereof.

Some examples of the method, apparatuses, and non-transitory computer-readable medium described herein may further include operations, features, means, or instructions for performing the set of beam measurements based on a beam measurement occasion during at least one of the time period before the active duration, the time period during the active duration, or a combination thereof and transmitting, in response to the set of beam measurements, the beam measurement report to the second device based on a beam report occasion during at least one of the time period during the active duration.

Some examples of the method, apparatuses, and non-transitory computer-readable medium described herein may further include operations, features, means, or instructions for transmitting, in response to a contention procedure to access the sidelink, the beam measurement report to the second device based on a beam report occasion during at least one of the time period before the active duration, the time period during the active duration, or a combination thereof.

Some examples of the method, apparatuses, and non-transitory computer-readable medium described herein may further include operations, features, means, or instructions for transmitting the beam measurement report to the second device during at least one of the time period before the active duration, the time period during the active duration, or a combination thereof, based on a condition.

Some examples of the method, apparatuses, and non-transitory computer-readable medium described herein may further include operations, features, means, or instructions for determining a first beam quality of a first beam and a second beam quality of a second beam based on the set of beam measurements, the first beam including a current beam used by the first device for the wireless communication. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on determining the first beam quality of the first beam and the second beam quality of the second beam.

Some examples of the method, apparatuses, and non-transitory computer-readable medium described herein may further include operations, features, means, or instructions for determining one or more of the first beam quality of the first beam or the second beam quality of the second beam satisfying a threshold. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on determining one or more of the first beam quality of the first beam or the second beam quality of the second beam satisfying the threshold.

Some examples of the method, apparatuses, and non-transitory computer-readable medium described herein may further include operations, features, means, or instructions for determining a quantity of transmission failures between the first device and the second device satisfying a threshold. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on determining the quantity of transmission failures satisfying the threshold.

Some examples of the method, apparatuses, and non-transitory computer-readable medium described herein may further include operations, features, means, or instructions for determining a beam failure count associated with the wireless communication satisfying a threshold. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on determining the beam failure count associated with the wireless communication satisfying the threshold.

Some examples of the method, apparatuses, and non-transitory computer-readable medium described herein may further include operations, features, means, or instructions for receiving a request for the beam measurement report from the second device or a third device, the second device including a UE and the third device including a base station. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on receiving the request for the beam measurement report.

Some examples of the method, apparatuses, and non-transitory computer-readable medium described herein may further include operations, features, means, or instructions for receiving a grant allocating a set of sidelink resources for transmitting the beam measurement report to the second device during at least one of the time period before the active duration, the time period during the active duration, or a combination thereof.

Some examples of the method, apparatuses, and non-transitory computer-readable medium described herein may further include operations, features, means, or instructions for performing a contention procedure associated with a sidelink for a set of sidelink resources for transmitting the beam measurement report to the second device during at least one of the time period before the active duration, the time period during the active duration, or a combination thereof. In some examples of the method, apparatuses, and non-transitory computer-readable medium described herein, transmitting the beam measurement report to the second device in accordance with the sidelink beam reporting resource configuration and during at least one of the time period before the active duration, the time period during the active duration, or a combination thereof, may be based on performing the contention procedure associated with the sidelink for the set of sidelink resources.

In some examples of the method, apparatuses, and non-transitory computer-readable medium described herein, the first device includes a first UE and the second device includes a second UE or a base station, the first device comprising an antenna or an antenna array.

A method for wireless communication at a first device is described. The method may include transmitting control signaling indicating a sidelink beam reporting resource configuration, transmitting a set of reference beams to a second device, and receiving a beam measurement report from the second device in accordance with the sidelink beam reporting resource configuration and during at least one of a time period before an active duration, a time period during the active duration, or a combination thereof.

An apparatus for wireless communication at a first device is described. The apparatus may include a processor, memory coupled to the processor, the processor and memory configured to transmit control signaling indicating a sidelink beam reporting resource configuration, transmit a set of reference beams to a second device, and receive a beam measurement report from the second device in accordance with the sidelink beam reporting resource configuration and during at least one of a time period before an active duration, a time period during the active duration, or a combination thereof.

Another apparatus for wireless communication at a first device is described. The apparatus may include means for transmitting control signaling indicating a sidelink beam reporting resource configuration, means for transmitting a set of reference beams to a second device, and means for receiving a beam measurement report from the second device in accordance with the sidelink beam reporting resource configuration and during at least one of a time period before an active duration, a time period during the active duration, or a combination thereof.

A non-transitory computer-readable medium storing code for wireless communication at a first device is described. The code may include instructions executable by a processor to transmit control signaling indicating a sidelink beam reporting resource configuration, transmit a set of reference beams to a second device, and receive a beam measurement report from the second device in accordance with the sidelink beam reporting resource configuration and during at least one of a time period before an active duration, a time period during the active duration, or a combination thereof.

In some examples of the method, apparatuses, and non-transitory computer-readable medium described herein, one or more of a beam measurement occasion or a beam report occasion occurs during at least one of the time period before the active duration, the time period during the active duration, or a combination thereof.

Some examples of the method, apparatuses, and non-transitory computer-readable medium described herein may further include operations, features, means, or instructions for receiving the beam measurement report from the second device based on a beam report occasion during at least one of the time period before the active duration.

Some examples of the method, apparatuses, and non-transitory computer-readable medium described herein may further include operations, features, means, or instructions for receiving the beam measurement report from the second device based on a beam report occasion during at least one of the time period during the active duration.

In some examples of the method, apparatuses, and non-transitory computer-readable medium described herein, the first device includes a first UE and the second device includes a second UE or a base station the first device comprising an antenna or an antenna array.

DETAILED DESCRIPTION

Figure 1:
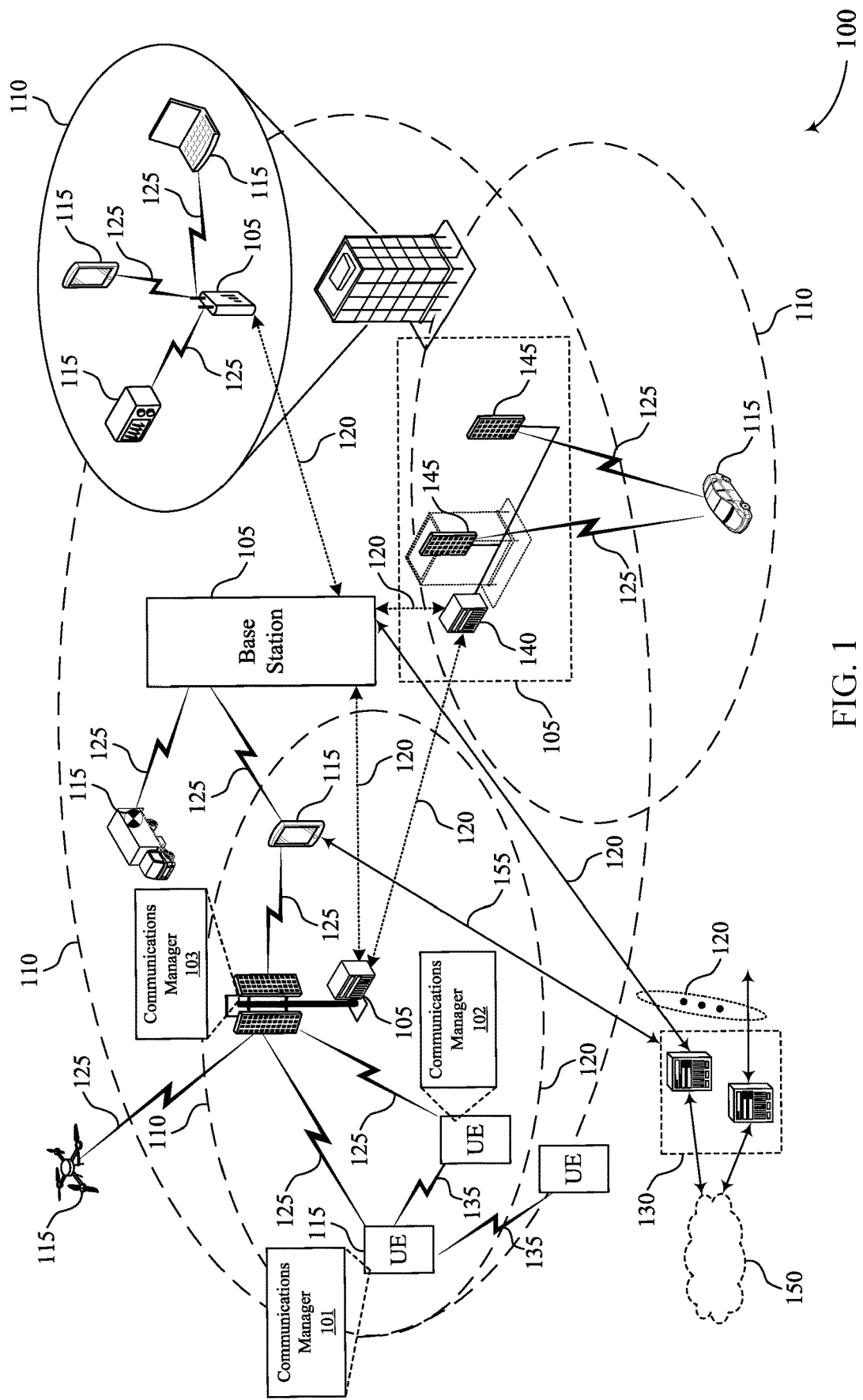
FIGS. 1 and 2 illustrate examples of wireless communications systems that support techniques for beam measurement reporting in accordance with one or more aspects of the present disclosure.

A wireless communications system may include communication devices, such as a UE and a base station that may support wireless communications using one or multiple radio access technologies. In the wireless communications system, wireless communications between a UE and a base station may occur over a communication link, such as an access link (also referred to as a Uu interface). The wireless communications system may additionally, or alternatively, support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, or cellular V2X (C-V2X) communications systems. Sidelink communications between UEs may occur over a communication link, such as a sidelink.

In the wireless communications system, a UE may be enabled to perform beamforming to improve the performance and the reliability of wireless communication over a sidelink. For example, a UE may receive reference beams from another UE in the wireless communications system, and perform beam measurements on the reference beams. The UE may then transmit a beam measurement report to indicate sidelink beams (e.g., a transmit sidelink beam or a receive sidelink beam, or both) for the UE to use for the wireless communications over the sidelink. In some cases, the timing of the exchange of the beam measurement report may impact the reporting due to a lack of coordination (e.g., timing for communicating the beam measurement report) between the UEs. Various aspects of the present disclosure relate to managing beam measurement reporting associated with the wireless communication to increase coordination between the UEs in the wireless communications system. By supporting beam measurement and reporting, a UE may experience power saving for sidelink communications. The described techniques may also promote high reliability and low latency sidelink communications.

A UE may operate according to a power saving mode (also referred to as a discontinuous reception (DRX) mode)

to preserve power by operating in an active state or an idle state (also referred to as a sleep state) according to the DRX mode. In the active state, the UE may monitor a channel (e.g., a sidelink channel), transmit wireless communication (e.g., sidelink communication), or receive wireless communication, among other examples, during an active duration (also referred to as an ON duration). In the idle state, the UE may not monitor the channel, transmit the wireless communication, or receive the wireless communication, among other examples, during an inactive duration (also referred to as an OFF duration). The UE may transmit a beam measurement report at different times with respect to an active duration.

The UE power saving mode (e.g., a DRX mode may allow the UE to save battery power by sleeping during an inactive duration (also referred to an OFF duration) and waking up during an active duration. In some examples, the UE may be configured to transmit a beam measurement report during a time period before an ON duration. That is, the UE may transmit the beam measurement report during a time period (e.g., symbols, slots) that falls within an OFF duration. A time period may include one or more symbols, slots, or the like. In some other examples, the UE may be configured to transmit the beam measurement report during the ON duration. In other examples, the UE may be configured to transmit the beam measurement report before the ON duration based on satisfying a condition as described herein. Otherwise, the UE may be configured to transmit the beam measurement report during the ON duration.

The UE may support wireless communication including transmission of the beam measurement report according to one or more modes. In a first mode (e.g., a mode 1), a base station may allocate sidelink resources (e.g., either dynamically or configured resources) for the UE. The UE may transmit, to another UE or a base station, the beam measurement report on sidelink resources, which may be configured by the network (e.g., a base station). Alternatively, in a second mode (e.g., a mode 2), the base station may not be involved in allocate sidelink resources. In other words, the UE may autonomously determine or contend for time and frequency resources for the wireless communications. That is, the sidelink resources may be contended for by the UE. For example, the UE may contend with other UEs in the wireless communications system for the sideline resources. Additionally, the UE may be configured to support beam measurement reporting to different UEs may separately or jointly as described herein.

The described techniques may provide for power saving at a UE based on managing beam measurement reporting by the UE. For example, by providing a beam measurement report earlier to another UE, the UE may promote high reliability and low latency sidelink communication. For example, by providing a beam measurement earlier, the UE may acquire a beam pair (e.g., transmit sidelink beam and receive sidelink beam) with a better beam quality (e.g., a beam associated with lower signal-to-noise ratio (SNR)) to use for sidelink communication.

Aspects of the disclosure are initially described in the context of wireless communications systems. Aspects of the disclosure are further illustrated by and described with reference to apparatus diagrams, system diagrams, and flowcharts that relate to techniques for beam measurement reporting.

FIG. 1 illustrates an example of a wireless communications system 100 that supports techniques for beam measurement reporting in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a STA, a remote device, a handheld device, or a subscriber device, or some other suitable terminology, where the "device" may also be referred to as a unit, a station, a terminal, or a client (e.g., a Wi-Fi client), among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $TS=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that provide power saving, such as half-duplex communications (e.g., a mode that supports one-way communication via transmission or reception, but not transmission and reception simultaneously). Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). The communication link 135 may also be referred to as a sidelink between at least two UEs 115. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 or FR2 into mid-band frequencies, or both. In addition, higher frequency bands are currently being explored to extend 5GNR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to affect link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may affect throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support relay operations to extend network coverage for a base station 105 and a UE 115. For example, a UE 115 may communicate directly with a base station 105 (e.g., a network operator of a network (e.g., a 4G network, a 5G network)). Alternatively, the UE 115 may communicate with the base station 105 indirectly through another UE 115 (also referred to as a relay UE). For example, a UE 115 and a base station 105 may be unable to communicate directly because the UE 115 may be out-of-coverage for the base station 105, and hence the demand for a relay UE to relay communications between the UE 115 and the base station 105. A UE 115 that is out-of-coverage may be referred to herein as a remote UE. The relay UE will use sidelink communications to support relay functionality by relaying information (e.g., data) for the remote UE. A UE 115 may support wireless communication according to one or more modes. In a first mode (e.g., a mode 1), a base station 105 may allocate resources (e.g., either dynamically or configured resources) for sidelink communications for a UE 115. Alternatively, in a second mode (e.g., a mode 2), the base station 105 may not be involved in the sidelink communications. In other words, the UE 115 may autonomously determine or contend for time and frequency resources for the sidelink communications.

Various aspects of the present disclosure relate to enabling a base station 105 and a UE 115 to support beam measurement reporting for wireless communication (e.g., sidelink communications) in the wireless communications system 100. A UE 115 may include a communications manager 101 that may support wireless communication (e.g., direct communication with a base station 105 or sidelink communications with another UE 115, or both) in accordance with examples as disclosed herein. The communications manager 101 may be an example of aspects of a communications manager as described in FIGS. 10 through 13. For example, the communications manager 101 may receive a set of reference beams from a base station 105 or another UE 115, or both. The communications manager 101 may perform a set of beam measurements based at least in part on the set of reference beams, and transmit a beam measurement report to the base station 105 or the other UE 115, or both, before an active duration or during the active duration based at least in part on the set of beam measurements. Additionally, the UE 115 may separately or jointly transmit the beam measurement report to additional UEs 115 in the wireless communications system 100.

A UE 115 may include a communications manager 102 that may support wireless communication (e.g., direct communication with a base station 105 or sidelink communications with another UE 115, or both) in accordance with examples as disclosed herein. The communications manager 102 may be an example of aspects of a communications manager as described in FIGS. 10 through 13. For example, the communications manager 102 may transmit a set of reference beams to another UE 115, and receive a beam measurement report from the other UE 115 before an active duration or during the active duration. Additionally, the communications manager 102 may transmit control signaling indicating a sidelink beam reporting resource configuration for the other UE 115 to use for the beam measurement report. As such, the communications manager 102 may receive the beam measurement report from the other UE 115 based at least in part on the sidelink beam reporting resource configuration.

A base station 105 may include a communications manager 103 that may support wireless communication (e.g., direction communication with one or more UE 115) in accordance with examples as disclosed herein. The communications manager 103 may be an example of aspects of a communications manager as described in FIGS. 10 through 13. For example, the communications manager 103 may transmit a set of reference beams to a UE 115, and receive a beam measurement report from the UE 115 before an active duration or during the active duration. Additionally or alternatively, the communications manager 103 may transmit control signaling indicating a sidelink beam reporting resource configuration for the UE 115 to use for the beam measurement report. As such, the communications manager 103 may receive the beam measurement report from the UE 115 based at least in part on the sidelink beam reporting resource configuration.

Figure 2:
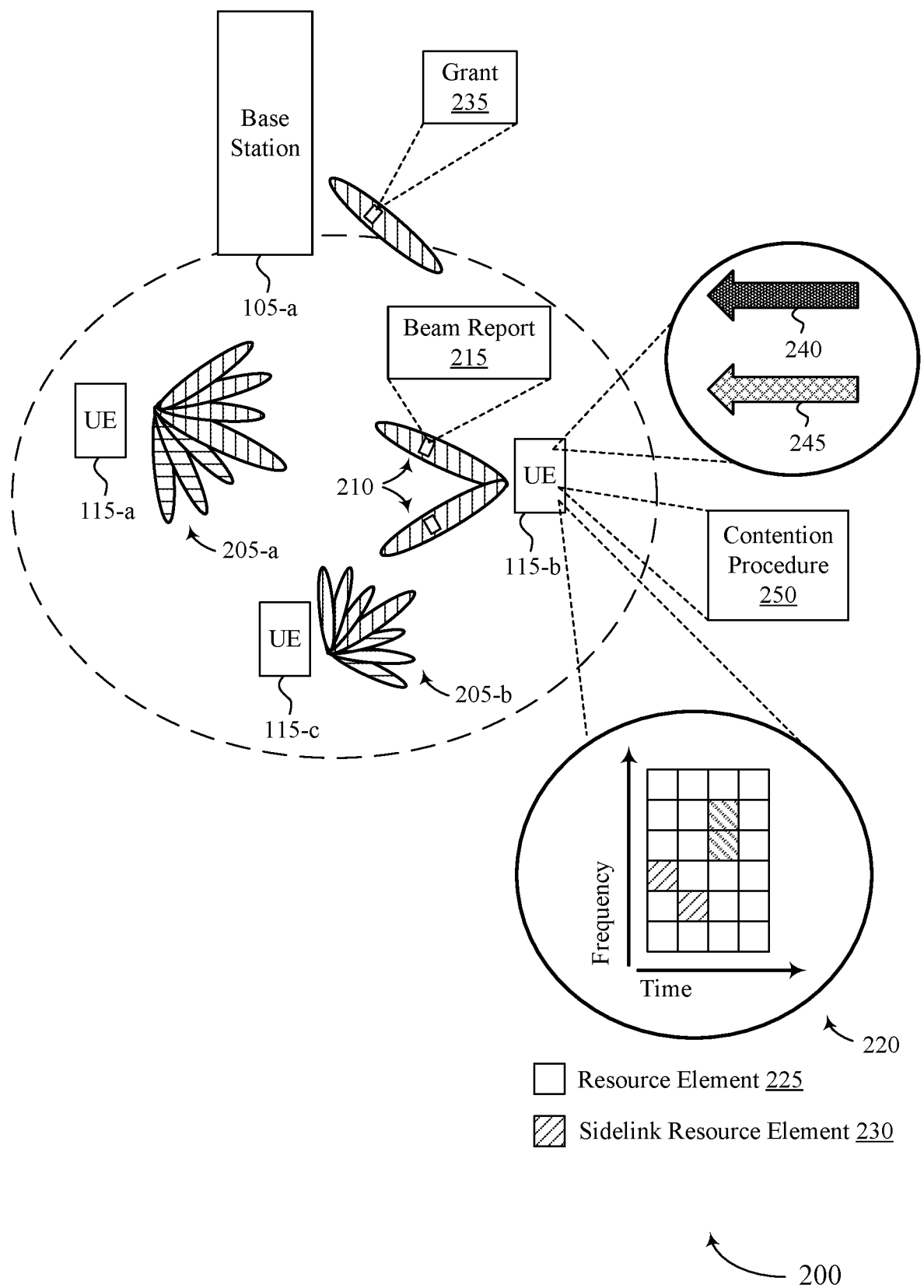

FIG. 2 illustrates an example of a wireless communications system 200 that supports techniques for beam measurement reporting in accordance with one or more aspects of the present disclosure. In some examples, the wireless communications system 200 may implement aspects of the wireless communications system 100 or may be implemented by aspects of the wireless communications system 100. For example, the wireless communications system 200 may include a base station 105-*a*, a UE 115-*a*, a UE 115-*b*, and a UE 115-*c*. The base station 105 and the UEs 115 may be examples of corresponding devices described herein with reference to FIG. 1. The wireless communications system 200 may support multiple radio access technologies including 4G systems such as LTE systems, LTE-A systems, or LTE-A Pro systems, and 5G systems, which may be referred to as NR systems. The wireless communications system 200 may also affect power consumption, spectral efficiency, higher data rates and, in some examples, may promote enhanced efficiency for higher reliability and lower latency wireless communications (e.g., uplink transmission, downlink transmission, uplink reception, and downlink reception, sidelink transmission, sidelink reception).

The base station 105-*a* and one or more of the UE 115-*a*, the UE 115-*b*, or the UE 115-*c* may be configured with multiple antennas, which may be used to employ techniques such as transmit diversity, receive diversity, multiple-input multiple-output communications, or beamforming, or any combination thereof. The antennas of the base station 105-*a* and one or more of the UE 115-*a*, the UE 115-*b*, or the UE 115-*c* may be located within one or more antenna arrays or antenna panels, which may support multiple-input multiple-output operations or transmit or receive beamforming. The base station 105-*a* may have an antenna array with a number of rows and columns of antenna ports that the base station 105-*a* may use to support beamforming of communications with one or more of the UE 115-*a*, the UE 115-*b*, or the UE 115-*c*. Likewise, one or more of the UE 115-*a*, the UE 115-*b*, or the UE 115-*c* may have one or more antenna arrays that may support various multiple-input multiple-output or beamforming operations. Additionally or alternatively, an antenna panel may support radio frequency beamforming for a signal transmitted via one or more antenna ports. The base station 105-*a* and one or more of the UE 115-*a*, the UE 115-*b*, or the UE 115-*c* may thus be configured to support beamforming communications using the multiple antennas.

In the example of FIG. 2, the base station 105-*a* may perform wireless communications with one or more of the UE 115-*a*, the UE 115-*b*, or the UE 115-*c* over a cellular link (also referred to as an access link) using multiple antennas. For example, the base station 105-*a* may perform wireless communications with one or more of the UE 115-*a*, the UE 115-*b*, or the UE 115-*c* over a Uu interface using multiple antennas. One or more of the UE 115-*a*, the UE 115-*b*, or the UE 115-*c* may perform sidelink communications with each other over a sidelink (e.g., a PC5 interface) using multiple antennas. For example, the UE 115-*b* may perform sidelink communications with one or more of the UE 115-*a* or the UE 115-*c* over a PC5 interface using multiple antennas. Therefore, the wireless communications system 200 includes multiple UEs 115 that may communicate directly with each other without going through the base station 105-*a*.

One or more of the UE 115-*a*, the UE 115-*b*, or the UE 115-*c* may enable beamforming communications to improve performance in the wireless communications system 200. For example, one or more of the UE 115-*a*, the UE 115-*b* c, or the UE 115-*c* may perform beamforming on a sidelink to improve performance of sidelink communications between one or more of the UE 115-*a*, the UE 115-*b*, or the UE 115-*c*. In some examples, one or more of the UE 115-*a*, the UE 115-*b*, or the UE 115-*c* may perform beam measurements to obtain a best beam pair (e.g., a transmit sidelink beam, a receive sidelink beam). For example, the UE 115-*a* may transmit one or more multiple reference beams 205 to the UE 115-*b*, which may perform beam measurements based on the one or more multiple reference beams 205 to acquire the best beam pair. The UE 115-*a* may be configured to transmit a set of reference beams 205-*a*, and in some examples, the UE 115-*b* may be configured to transmit an additional set of reference beams 205-*b*. The UE 115-*b* may then transmit, to one or more of the UE 115-*a* or the UE 115-*c*, a beam report 215 on one or more beams 210 to indicate a beam or beam pair used by the UE 115-*b* for sidelink communications in the wireless communications system 200. Therefore, beam measurement and reporting may enable one or more of the UE 115-*a*, the UE 115-*b*, or the UE 115-*c* to obtain a best beam pair (e.g., transmit sidelink beam and receive sidelink beam) for sidelink communications over a sidelink in the wireless communications system 200. In the example of FIG. 2, there may be a one-to-one correspondence between one or more of the references beams 205-*a*, the reference beams 205-*b*, or the beams 210.

Various aspects of the present disclosure relate to timing of a beam report for sidelink. In the example of FIG. 2, one or more of the UE 115-*a*, the UE 115-*b*, or the UE 115-*c* may be configured to transmit a beam report with respect to an active duration (also referred to as an ON duration as described with reference to FIGS. 2 through 8). By way of example, the UE 115-*b* may be configured to transmit a beam report 215 with respect to an active duration (also referred to as an ON duration as described with reference to FIGS. 2 through 8). More particularly, the UE 115-*b* may transmit the beam report 215 during a time period before the active duration or during the active duration. In some examples, the UE 115-*b* may be configured to transmit the beam report 215 during the time period before the active duration based on one or more conditions as described with reference to FIGS. 7 and 8. Otherwise, the UE 115-*b* may transmit the beam report 215 during the active duration.

One or more of the UE 115-*a*, the UE 115-*b*, or the UE 115-*c* may be configured to transmit a beam report over a sidelink using one or more sidelink resources. In some examples, one or more sidelink resources for transmitting a beam report may be configured by the base station 105-*a*. In some examples, the base station 105-*a* may transmit control signaling (e.g., an RRC message, a downlink control information (DCI) message) configuring one or more sidelink resources for transmitting a beam report. In some other examples, the base station 105-*a* may transmit control signaling (e.g., a DCI message) indicating a grant, which may allocate one or more resources 220 including sidelink resources for transmitting a beam report. For example, the base station 105-*a* may transmit, to the UE 115-*b*, a grant allocating (or scheduling) one or more sidelink resources for the UE 115-*b* to use for transmitting the beam report 215 to the UE 115-*a*. Alternatively, one or more of the UE 115-*a*, the UE 115-*b*, or the UE 115-*c* may be configured to perform a contention procedure 250 to contend for one or more resources 220, such as sidelink resources. For example, the UE 115-*b* may contend a sidelink channel for one or more sidelink resources against other UEs, such as the UE 115-*a* or the UE 115-*c*.

One or more resources may span one or more resource elements 225, which may be used for various reasons including monitoring a control channel 240 or data channel 245, among other operations that may be non-specific to sidelink communications. The one or more sidelink resources may span one or more sidelink resource elements 230 (e.g., symbols, slots, subcarriers, carriers). As illustrated in FIG. 2, one or more sidelink resources may be contiguous in a time domain. Additionally or alternatively, one or more sidelink resources may be contiguous in a frequency domain. In the example of FIG. 2, one or more of the UE 115-*a*, the UE 115-*b*, or the UE 115-*c* may be configured to determine the one or more sidelink resources to transmit a beam report based on a mode. For example, the UE 115-*b* may be configured to transmit the beam report 215 based on a first mode or a second mode, or both.

The first mode may correspond to the UE 115-*b* receiving the grant 235 from the base station 105-*a*, which may allocate sidelink resources and schedule the UE 115-*b* for transmitting the beam report 215. The UE 115-*b* may transmit the beam report 215 using the dedicated reported grant 235 after performing beam measurement. The base station 105-*a* may configure granted resources, therefore, one or more of the UE 115-*a*, the UE 115-*b*, or the UE 115-*c* may not enable a configuration directly, but rather apply for the grant 235 from the base station 105-*a*. In some examples, the configuration of the grant 235 can be dependent on specific occurrences of beam measurement. Under the first mode, beam reporting may not be next to or during an active duration, as there may be multiple beam measurements and reporting from other UEs 115 or beam measurement is decoupled with the active duration.

Alternatively, the second mode may correspond to the UE 115-*b* contending for the sidelink resources for transmitting the beam report 215. That is, the UE 115-*b* may contend a sidelink for the one or more sidelink resources before transmitting the beam report 215, after beam measurements. If the UE 115-*a* is operating in an active duration, the UE 115-*a* may monitor for the beam report 215 from the UE 115-*b*. Else if, the UE 115-*b* is operating in the active duration, then the UE 115-*a* switches to active in order to receive the beam report 215 from the UE 115-*b*. Thus, for the UE 115-*b* to transmit the beam report 215 under the second mode, the UE 115-*b* may contend a sidelink and obtain the one or more sidelink resources to transmit the beam report 215.

Figure 3:
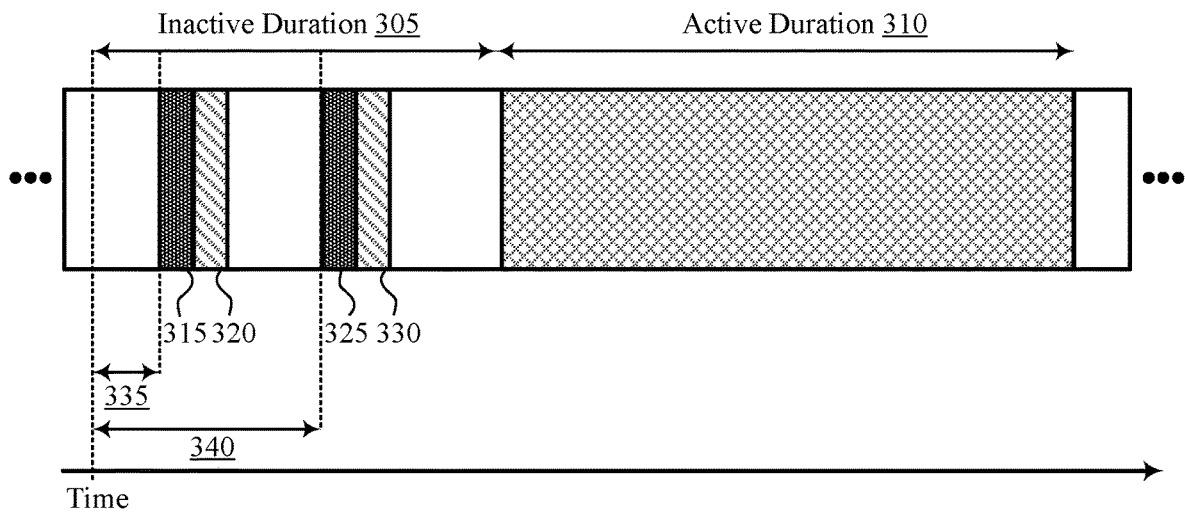
FIGS. 3 through 8 illustrate example of timelines that support techniques for beam measurement reporting in accordance with one or more aspects of the present disclosure.
Figure 3:
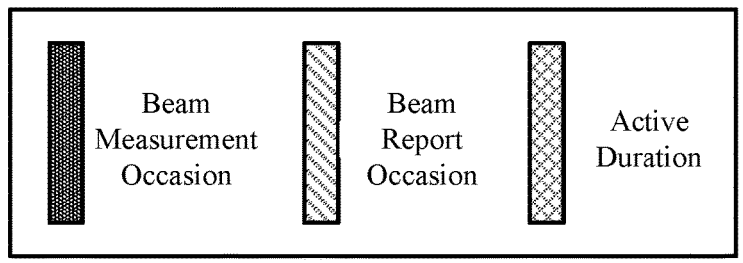

FIG. 3 illustrates an example of a timeline 300 that supports techniques for beam measurement reporting in accordance with one or more aspects of the present disclosure. The timeline 300 may implement aspects of the wireless communications systems 100 and 200, or may be implemented by aspects of the wireless communications systems 100 and 200, as described with reference to FIGS. 1 and 2, respectively. For example, the timeline 300 may be based on a configuration by a base station 105, which may be implemented by a UE 115 to provide power saving for the UE 115. Alternatively, the timeline 300 may be based on a configuration by a UE 115, which may be implemented by the UE 115 to promote high reliability and low latency wireless communications (e.g., sidelink communications).

A UE 115 may support discontinuous reception (DRX) operations in which the UE 115 may enter an inactive state (e.g., power-down during an inactive duration 305 (also referred to as an OFF duration) of a DRX cycle) and stop monitoring of control or data channels (e.g., a sidelink data channel, a sidelink control channel, etc.), as well as enter an active state (e.g., power-up during an active duration 310 (also referred to as an ON duration) of a DRX cycle) to monitor the control or data channels to receive control information (e.g., sidelink control information) or data (e.g., sidelink data).

A UE 115 may be configured with one or more parameters, which may define an offset and a period of a DRX cycle. An offset may correspond to the inactive duration 305, which may be a delay period before the active duration 310. The UE 115 may be configured via a control message (e.g., an RRC message or a DCI message), which may include a parameter indicating the delay period. For example, the parameter may be a sidelink DRX offset duration (also referred to as sl-drx-slot offset), which indicate the delay period before a beginning of the active duration 310. A period of a DRX cycle may correspond to the active duration 310. The UE 115 may be configured via a control message (e.g., an RRC message or a DCI message), which may include a parameter indicating a timer (also referred to as sl-drx-ON duration timer), which the UE 115 may activate at the beginning of the active duration 310. The timer may define a period of the active duration 310.

In the example of FIG. 3, a UE 115 (e.g., the UE 115-*b* with reference to FIG. 2) may perform a set of beam measurements based at least in part on a beam measurement occasion before the active duration 310 (e.g., during a time period that falls within the inactive duration 305). For example, a UE 115 may perform a set of beam measurements on a set of reference beams (e.g., sidelink reference beams) received from another UE 115 (e.g., the UE 115-*a* with reference to FIG. 2) based at least in part on a beam measurement occasion 315 before the active duration 310 (e.g., during a time period that falls within the inactive duration 305). In some examples, the UE 115 may perform the set of beam measurements based at least in part on an offset 335 (also referred to as a sidelink beam measurement offset), which may indicate a delay period before the UE 115 begins the set of beam measurements. The UE 115 may transmit a beam measurement report to the other UE 115 based at least in part on a beam report occasion 320.

Additionally or alternatively, a UE 115 may perform another set of beam measurements on an additional set of reference beams received from another UE 115 (e.g., the UE 115-*c* with reference to FIG. 2) based at least in part on a beam measurement occasion 325 before the active duration 310 (e.g., during a time period that falls within the inactive duration 305). In some examples, the UE 115 may perform the other set of beam measurements based at least in part on an offset 340 (also referred to as a sidelink beam measurement offset), which may indicate a delay period before the UE 115 begins the other set of beam measurements. Similarly, the UE 115 may transmit a beam measurement report to the other UE 115 based at least in part on a beam report occasion 330.

A UE 115 may transmit a beam measurement report on one or more sidelink resources in one or more of a time domain (e.g., symbols, slots, subframes, frames) or a frequency domain (e.g., subcarriers, carriers). In some examples, a base station 105 (e.g., the base station 105-*a* with reference to FIG. 2) or another UE 115 (e.g., the UE 115-*a* with reference to FIG. 2) may transmit a grant allocating the one or more sidelink resources for the UE 115 to use for the beam measurement report. Alternatively, the one or more sidelink resources may be preconfigured via RRC configuration.

As illustrated in FIG. 3, the beam report occasion 320 may be adjacent to the beam measurement occasion 315. In other words, the beam report occasion 320 and the beam measurement occasion 315 may be contiguous in a time domain (e.g., symbols or slots that are contiguous in a time domain). In some examples, the beam report occasion 320 and the beam measurement occasion 315 may be contiguous in the time domain based on a configuration (e.g., an RRC configuration, a DCI) by a base station 105. By having the beam report occasion 320 and the beam measurement occasion 315 be contiguous in the time domain, the UE 115 may perform the beam reporting earlier. Likewise, the beam report occasion 330 may be adjacent to the beam measurement occasion 325. In both examples, the beam report occasion 320 and the beam report occasion 330 occur before the active duration 310 (e.g., during one or more time periods that fall within the inactive duration 305). A UE 115 performing beam measurement and reporting as described with reference to FIG. 3 may experience power saving by performing the beam reporting contiguously after the beam measurements. A base station 105 and a UE 115 (including a group of UEs) may be support coordination between beam measurement occasions and beam reporting occasions to support performing the beam reporting contiguously after the beam measurements.

Figure 4:
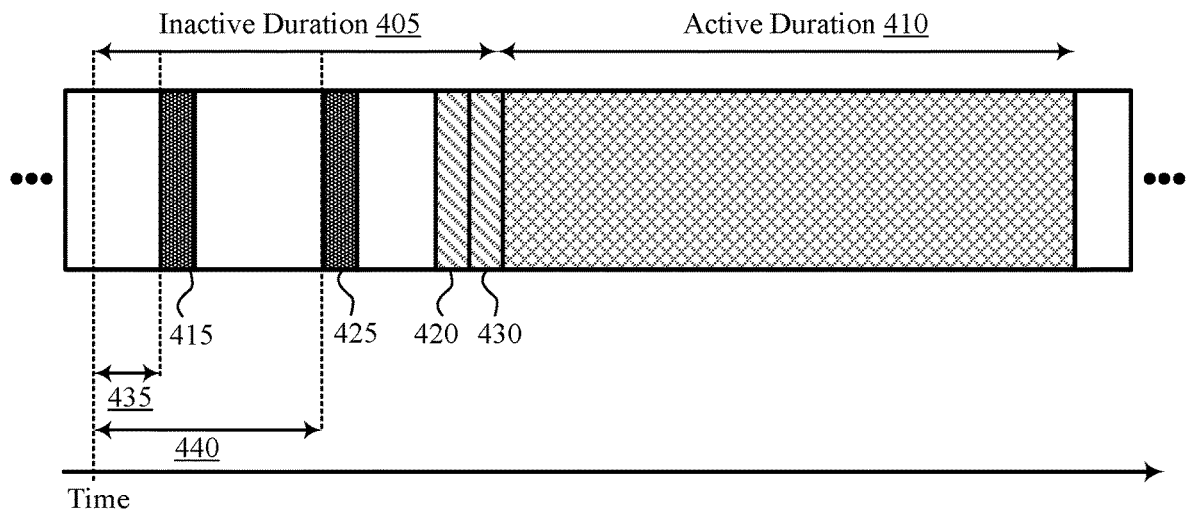
Figure 4:
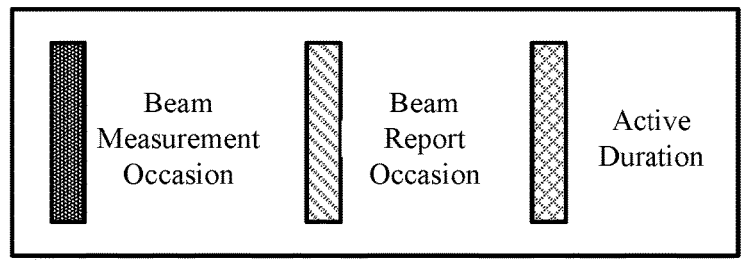

FIG. 4 illustrates an example of a timeline 400 that supports techniques for beam measurement reporting in accordance with one or more aspects of the present disclosure. The timeline 400 may implement aspects of the wireless communications systems 100 and 200, or may be implemented by aspects of the wireless communications systems 100 and 200, as described with reference to FIGS. 1 and 2, respectively. For example, the timeline 400 may be based on a configuration by a base station 105, which may be implemented by a UE 115 to provide power saving for the UE 115. Alternatively, the timeline 400 may be based on a configuration by a UE 115, which may be implemented by the UE 115 to promote high reliability and low latency wireless communications (e.g., sidelink communications).

A UE 115 may support DRX operations in which the UE 115 may enter an inactive state (e.g., power-down during an inactive duration 405 (also referred to as an OFF duration) of a DRX cycle) and stop monitoring of control or data channels (e.g., a sidelink data channel, a sidelink control channel, etc.), as well as enter an active state (e.g., power-up during an active duration 410 (also referred to as an ON duration) of a DRX cycle) to monitor the control or data channels to receive control information (e.g., sidelink control information) or data (e.g., sidelink data).

A UE 115 may be configured with one or more parameters, which may define an offset and a period of a DRX cycle. An offset may correspond to the inactive duration 405, which may be a delay period before the active duration 410. The UE 115 may be configured via a control message, which may include a parameter indicating the delay period. For example, the parameter may be a sidelink DRX offset duration (also referred to as sl-drx-slot offset), which indicate the delay period before a beginning of the active duration 410. A period of a DRX cycle may correspond to the active duration 410. The UE 115 may be configured via a control message, which may include a parameter indicating a timer (also referred to as sl-drx-ON duration timer), which the UE 115 may activate at the beginning of the active duration 410. The timer may define a period of the active duration 410.

In the example of FIG. 4, a UE 115 (e.g., the UE 115-b with reference to FIG. 2) may perform a set of beam measurements based at least in part on a beam measurement occasion before the active duration 410 (e.g., during a time period that falls within the inactive duration 405). For example, a UE 115 may perform a set of beam measurements on a set of reference beams (e.g., the set of reference beams 205-a with reference to FIG. 2) received from another UE 115 (e.g., the UE 115-a with reference to FIG. 2) based at least in part on a beam measurement occasion 415 before the active duration 410 (e.g., during a time period that falls within the inactive duration 405). In some examples, the UE 115 may perform the set of beam measurements based at least in part on an offset 435 (also referred to as a sidelink beam measurement offset), which may indicate a delay period before the UE 115 begins the set of beam measurements. The UE 115 may transmit a beam measurement report to the other UE 115 based at least in part on a beam report occasion 420.

Additionally or alternatively, a UE 115 may perform another set of beam measurements on an additional set of reference beams (e.g., the additional set of reference beams 205-b with reference to FIG. 2) received from another UE 115 (e.g., the UE 115-c with reference to FIG. 2) based at least in part on a beam measurement occasion 425 before the active duration 410 (e.g., during a time period that is within the inactive duration 405). In some examples, the UE 115 may perform the other set of beam measurements based at least in part on an offset 440 (also referred to as a sidelink beam measurement offset), which may indicate a delay period before the UE 115 begins the other set of beam measurements. Similarly, the UE 115 may transmit a beam measurement report to the other UE 115 based at least in part on a beam report occasion 430.

A UE 115 may transmit a beam measurement report on one or more sidelink resources in one or more of a time domain (e.g., symbols, slots, subframes, frames) or a frequency domain (e.g., subcarriers, carriers). In some examples, a base station 105 (e.g., the base station 105-a with reference to FIG. 2) or another UE 115 (e.g., the UE 115-a with reference to FIG. 2) may transmit a grant allocating the one or more sidelink resources for the UE 115 to use for the beam measurement report. Alternatively, the one or more sidelink resources may be preconfigured via RRC configuration. In some examples, the UE 115 may perform a contention procedure to contend a sidelink for the one or more sidelink resources.

As illustrated in FIG. 4, the beam report occasion 420 may be nonadjacent to the beam measurement occasion 415. In other words, the beam report occasion 420 and the beam measurement occasion 415 may be noncontiguous in a time domain (e.g., symbols or slots that are noncontiguous in a time domain). Likewise, the beam report occasion 430 may be nonadjacent to the beam measurement occasion 425. However, as illustrated in FIG. 4, the beam report occasion 420 may be adjacent with the beam report occasion 430. That is, the beam report occasion 420 may be contiguous with the beam report occasion 430 in a time domain. The beam report occasion 420 and the beam report occasion 430 occur during a time period (e.g., that falls within the inactive duration 405) before the active duration 410. For example, a UE 115 may be configured to perform beam measurement reporting at an ending of the inactive duration 405, but before the active duration 410 (e.g., during a time period at an ending of the inactive duration 405 but before the active duration 410).

In some examples, a UE 115 (e.g., the UE 115-b with reference to FIG. 2) may transmit separately or jointly a beam report to each of the other UEs 115 (e.g., the UE 115-a and the UE 115-c with reference to FIG. 2) before the active duration 410. As such, the UE 115 (e.g., the UE 115-b with reference to FIG. 2) may group the beam reporting to multiple UEs 115 (e.g., the UE 115-a and the UE 115-c with reference to FIG. 2). A UE 115 performing beam measurement and reporting as described with reference to FIG. 4 may experience power saving by performing the beam reporting separately or jointly, and contiguously for the beam measurements.

Figure 5:
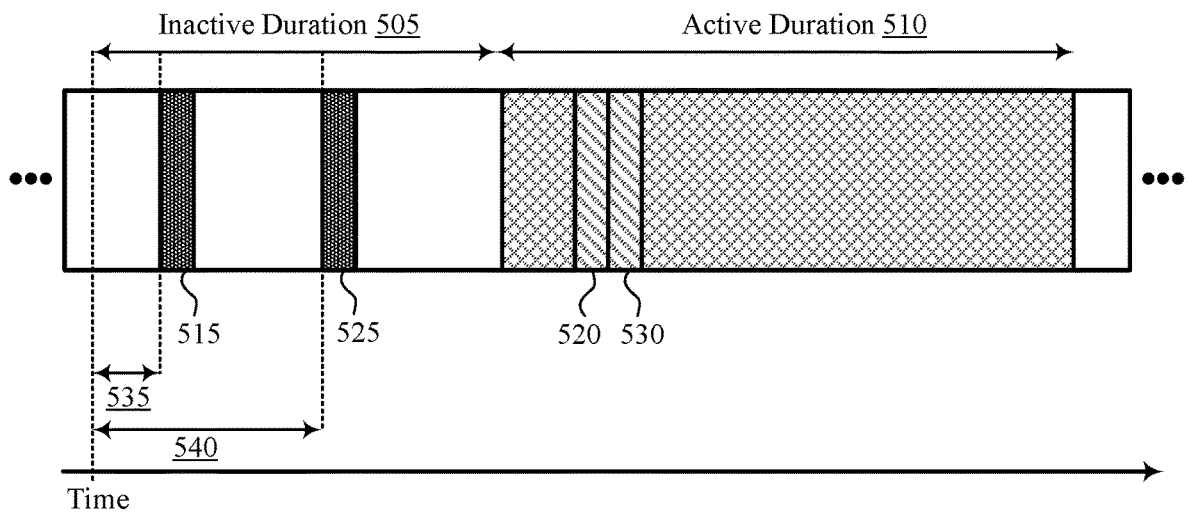
Figure 5:
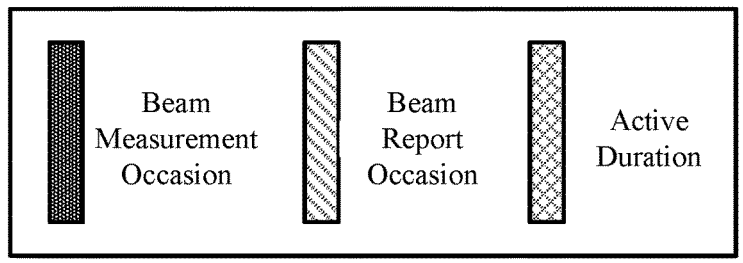

FIG. 5 illustrates an example of a timeline 500 that supports techniques for beam measurement reporting in accordance with one or more aspects of the present disclosure. The timeline 500 may implement aspects of the wireless communications systems 100 and 200, or may be implemented by aspects of the wireless communications systems 100 and 200, as described with reference to FIGS. 1 and 2, respectively. For example, the timeline 500 may be based on a configuration by a base station 105, which may be implemented by a UE 115 to provide power saving for the UE 115. Alternatively, the timeline 500 may be based on a configuration by a UE 115, which may be implemented by the UE 115 to promote high reliability and low latency wireless communications (e.g., sidelink communications).

A UE 115 may support DRX operations in which the UE 115 may enter an inactive state (e.g., power-down during an inactive duration 505 (also referred to as an OFF duration) of a DRX cycle) and stop monitoring of control or data channels (e.g., a sidelink data channel, a sidelink control channel, etc.), as well as enter an active state (e.g., power-up during an active duration 510 (also referred to as an ON duration) of a DRX cycle) to monitor the control or data channels to receive control information (e.g., sidelink control information) or data (e.g., sidelink data).

A UE 115 may be configured with one or more parameters, which may define an offset and a period of a DRX cycle. An offset may correspond to the inactive duration 505, which may be a delay period before the active duration 510. The UE 115 may be configured via a control message, which may include a parameter indicating the delay period. For example, the parameter may be a sidelink DRX offset duration (also referred to as sl-drx-slot offset), which indicate the delay period before a beginning of the active duration 510. A period of a DRX cycle may correspond to the active duration 510. The UE 115 may be configured via a control message, which may include a parameter indicating a timer (also referred to as sl-drx-ON duration timer), which the UE 115 may activate at the beginning of the active duration 510. The timer may define a period of the active duration 510.

In the example of FIG. 5, a UE 115 (e.g., the UE 115-b with reference to FIG. 2) may perform a set of beam measurements based at least in part on a beam measurement occasion before the active duration 510 (e.g., during a time period that is within the inactive duration 505). For example, a UE 115 may perform a set of beam measurements on a set of reference beams (e.g., the set of reference beams 205-a with reference to FIG. 2) received from another UE 115 (e.g., the UE 115-a with reference to FIG. 2) based at least in part on a beam measurement occasion 515 before the active duration 510 (e.g., during a time period that is within the inactive duration 505). In some examples, the UE 115 may perform the set of beam measurements based at least in part on an offset 535 (also referred to as a sidelink beam measurement offset), which may indicate a delay period before the UE 115 begins the set of beam measurements. The UE 115 may transmit a beam measurement report to the other UE 115 based at least in part on a beam report occasion 520.

Additionally or alternatively, a UE 115 may perform another set of beam measurements on an additional set of reference beams (e.g., the additional set of reference beams 205-b with reference to FIG. 2) received from another UE 115 (e.g., the UE 115-c with reference to FIG. 2) based at least in part on a beam measurement occasion 525 before the active duration 510 (e.g., during a time period that is within the inactive duration 505). In some examples, the UE 115 may perform the other set of beam measurements based at least in part on an offset 540 (also referred to as a sidelink beam measurement offset), which may indicate a delay period before the UE 115 begins the other set of beam measurements. Similarly, the UE 115 may transmit a beam measurement report to the other UE 115 based at least in part on a beam report occasion 530.

As illustrated in FIG. 5, the beam report occasion 520 may be nonadjacent to the beam measurement occasion 515. In other words, the beam report occasion 520 and the beam measurement occasion 515 may be noncontiguous in a time domain (e.g., symbols or slots that are noncontiguous in a time domain). Likewise, the beam report occasion 530 may be nonadjacent to the beam measurement occasion 525. As illustrated in FIG. 5, the beam report occasion 520 may be adjacent with the beam report occasion 530. That is, the beam report occasion 520 may be contiguous with the beam report occasion 530 in a time domain. Additionally, the beam report occasion 520 and the beam report occasion 530 occur during the active duration 510. In other words, a UE 115 may defer beam reporting until the active duration 510.

A UE 115 (e.g., the UE 115-b with reference to FIG. 2) may transmit separately or jointly a beam report to each of the other UEs 115 (e.g., the UE 115-a and the UE 115-c with reference to FIG. 2) during the active duration 510. As such, the UE 115 (e.g., the UE 115-b with reference to FIG. 2) may group the beam reporting to multiple UEs 115 (e.g., the UE 115-a and the UE 115-c with reference to FIG. 2). A UE 115 performing beam measurement and reporting as described with reference to FIG. 5 may experience power saving by performing the beam reporting separately or jointly, and contiguously for the beam measurements during the active duration 510.

Figure 6:
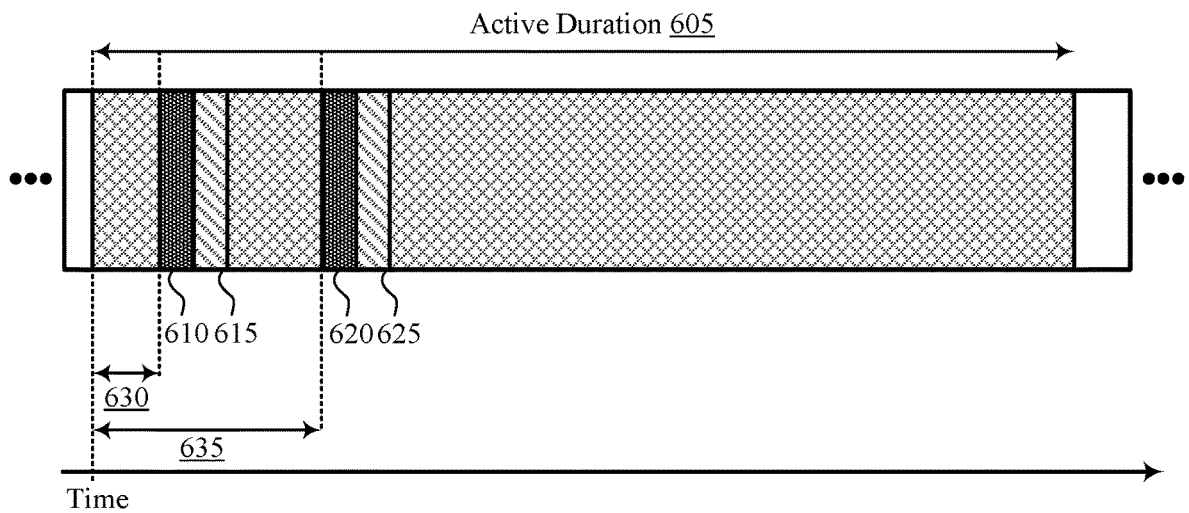
Figure 6:
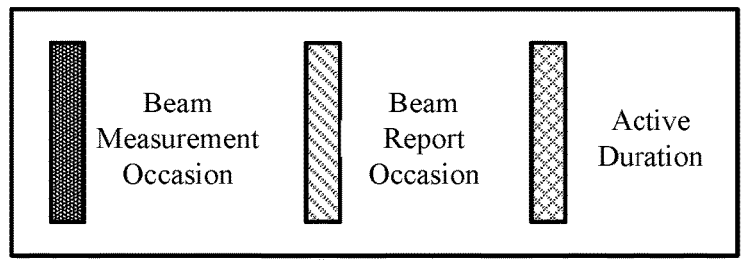

FIG. 6 illustrates an example of a timeline 600 that supports techniques for beam measurement reporting in accordance with one or more aspects of the present disclosure. The timeline 600 may implement aspects of the wireless communications systems 100 and 200, or may be implemented by aspects of the wireless communications systems 100 and 200, as described with reference to FIGS. 1 and 2, respectively. For example, the timeline 600 may be based on a configuration by a base station 105, which may be implemented by a UE 115 to provide power saving for the UE 115. Alternatively, the timeline 600 may be based on a configuration by a UE 115, which may be implemented by the UE 115 to promote high reliability and low latency wireless communications (e.g., sidelink communications).

A UE 115 may support DRX operations in which the UE 115 may enter an active state (e.g., power-up during an active duration 605 (also referred to as an ON duration) of a DRX cycle) to monitor control or data channels (e.g., sidelink control channels, sidelink data channels, etc.) to receive control information or data (e.g., sidelink data). The UE 115 may be configured with one or more parameters, which may define a period of a DRX cycle. A period of a DRX cycle may correspond to the active duration 605. The UE 115 may be configured via a control message, which may include a parameter indicating a timer (also referred to as sl-drx-ON duration timer), which the UE 115 may activate at the beginning of the active duration 605. The timer may define a period of the active duration 605.

In the example of FIG. 6, a UE 115 (e.g., the UE 115-b with reference to FIG. 2) may perform a set of beam measurements based at least in part on a beam measurement occasion during the active duration 605. For example, a UE 115 may perform a set of beam measurements on a set of reference beams (e.g., the set of reference beams 205-a with reference to FIG. 2) received from another UE 115 (e.g., the UE 115-a with reference to FIG. 2) based at least in part on a beam measurement occasion 610 during the active duration 605. In some examples, the UE 115 may perform the set of beam measurements based at least in part on an offset 630 (also referred to as a sidelink beam measurement offset), which may indicate a delay period before the UE 115 begins the set of beam measurements. The UE 115 may transmit a beam measurement report to the other UE 115 based at least in part on a beam report occasion 615.

Additionally or alternatively, a UE 115 may perform another set of beam measurements on an additional set of reference beams (e.g., the additional set of reference beams 205-b with reference to FIG. 2) received from another UE 115 (e.g., the UE 115-c with reference to FIG. 2) based at least in part on a beam measurement occasion 620 during the active duration 605. In some examples, the UE 115 may perform the other set of beam measurements based at least in part on an offset 635 (also referred to as a sidelink beam measurement offset), which may indicate a delay period before the UE 115 begins the other set of beam measurements. Similarly, the UE 115 may transmit a beam measurement report to the other UE 115 based at least in part on a beam report occasion 625.

As illustrated in FIG. 6, the beam report occasion 615 may be adjacent to the beam measurement occasion 610. Likewise, the beam report occasion 625 may be adjacent to the beam measurement occasion 620. As further illustrated in FIG. 6, the beam measurement occasions and the beam reporting occasions occur during the active duration 605 (e.g., during a time period within the active duration 605). A UE 115 (e.g., the UE 115-b with reference to FIG. 2) may transmit separately or jointly a beam report to each of the other UEs 115 (e.g., the UE 115-a and the UE 115-c with reference to FIG. 2) during the active duration 605. As such, the UE 115 (e.g., the UE 115-b with reference to FIG. 2) may group the beam reporting to multiple UEs 115 (e.g., the UE 115-a and the UE 115-c with reference to FIG. 2). In the example of FIG. 6, either a UE 115 (e.g., the UE 115-b with reference to FIG. 2) is powered-on or the other UEs 115 (e.g., the UE 115-a or the UE 115-c with reference to FIG. 2) are powered-on during the active duration 605. A UE 115 performing beam measurement and reporting as described with reference to FIG. 6 may experience power saving by performing the beam reporting separately and contiguously for the beam measurements during the active duration 605.

Figure 7:
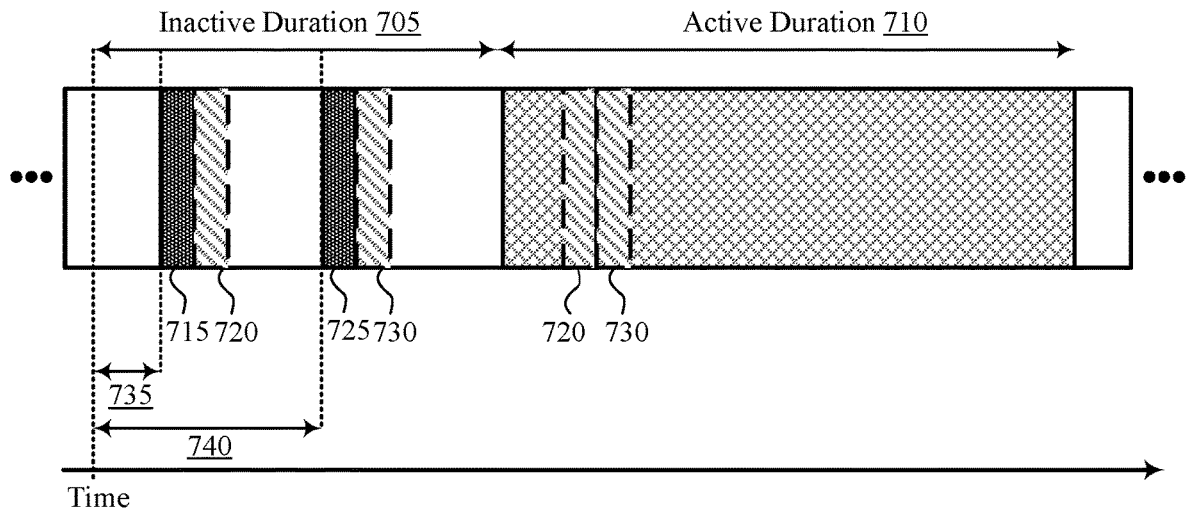
Figure 7:
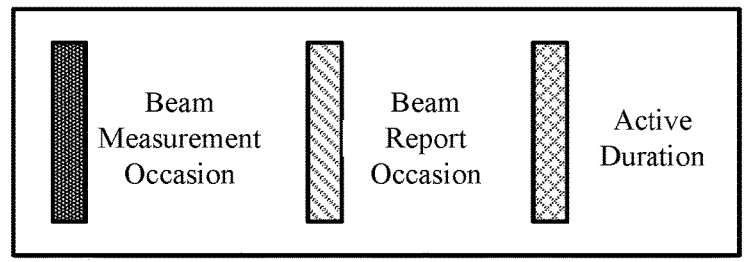

FIG. 7 illustrates an example of a timeline 700 that supports techniques for beam measurement reporting in accordance with one or more aspects of the present disclosure. The timeline 700 may implement aspects of the wireless communications systems 100 and 200, or may be implemented by aspects of the wireless communications systems 100 and 200, as described with reference to FIGS. 1 and 2, respectively. For example, the timeline 700 may be based on a configuration by a base station 105, which may be implemented by a UE 115 to provide power saving for the UE 115. Alternatively, the timeline 700 may be based on a configuration by a UE 115, which may be implemented by the UE 115 to promote high reliability and low latency wireless communications (e.g., sidelink communications).

A UE 115 may support DRX operations in which the UE 115 may enter an inactive state (e.g., power-down during an inactive duration 705 (also referred to as an OFF duration) of a DRX cycle) and stop monitoring of control or data channels (e.g., a sidelink data channel, a sidelink control channel, etc.), as well as enter an active state (e.g., power-up during an active duration 710 (also referred to as an ON duration) of a DRX cycle) to monitor the control or data channels to receive control information (e.g., sidelink control information) or data (e.g., sidelink data).

A UE 115 may be configured with one or more parameters, which may define an offset and a period of a DRX cycle. An offset may correspond to the inactive duration 705, which may be a delay period before the active duration 710. The UE 115 may be configured via a control message (e.g., an RRC message or a DCI message), which may include a parameter indicating the delay period. For example, the parameter may be a sidelink DRX offset duration (also referred to as sl-drx-slot offset), which indicate the delay period before a beginning of the active duration 710. A period of a DRX cycle may correspond to the active duration 710. The UE 115 may be configured via a control message (e.g., an RRC message or a DCI message), which may include a parameter indicating a timer (also referred to as sl-drx-ON duration timer), which the UE 115 may activate at the beginning of the active duration 710. The timer may define a period of the active duration 710.

In the example of FIG. 7, a UE 115 (e.g., the UE 115-b with reference to FIG. 2) may perform a set of beam measurements based at least in part on a beam measurement occasion before the active duration 710. For example, a UE 115 may perform a set of beam measurements on a set of reference beams (e.g., the set of reference beams 205-a with reference to FIG. 2) received from another UE 115 (e.g., the UE 115-a with reference to FIG. 2) based at least in part on a beam measurement occasion 715 before the active duration 710 (e.g., during a time period within the inactive duration 705). In some examples, the UE 115 may perform the set of beam measurements based at least in part on an offset 735 (also referred to as a sidelink beam measurement offset), which may indicate a delay period before the UE 115 begins the set of beam measurements. Additionally or alternatively, a UE 115 may perform another set of beam measurements on an additional set of reference beams (e.g., the additional set of reference beams 205-b with reference to FIG. 2) received from another UE 115 (e.g., the UE 115-c with reference to FIG. 2) based at least in part on a beam measurement occasion 725 before the active duration 710. In some examples, the UE 115 may perform the other set of beam measurements based at least in part on an offset 740 (also referred to as a sidelink beam measurement offset), which may indicate a delay period before the UE 115 begins the other set of beam measurements.

The UE 115 may transmit a beam measurement report to the other UE 115 based at least in part on a beam report occasion 720. Similarly, the UE 115 may transmit a beam measurement report to the other UE 115 based at least in part on a beam report occasion 730. The UE 115 may transmit a beam measurement report on one or more sidelink resources in one or more of a time domain (e.g., symbols, slots, subframes, frames) or a frequency domain (e.g., subcarriers, carriers). In some examples, a base station 105 (e.g., the base station 105-a with reference to FIG. 2) or another UE 115 (e.g., the UE 115-a with reference to FIG. 2) may transmit a grant allocating the one or more sidelink resources for the UE 115 to use for the beam measurement report. In some other examples, the one or more sidelink resources may be preconfigured via RRC configuration. In other examples, the UE 115 may perform a contention procedure to contend a sidelink for the one or more sidelink resources.

As illustrated in FIG. 7, the beam report occasion 720 may be adjacent to the beam measurement occasion 715. Likewise, the beam report occasion 730 may be adjacent to the beam measurement occasion 725. Here, both the beam report occasion 720 and the beam report occasion 730 occur before the active duration 710. Alternatively, as illustrated in FIG. 7, the beam report occasion 720 may be nonadjacent to the beam measurement occasion 715. Likewise, the beam report occasion 730 may be nonadjacent to the beam measurement occasion 725. Here, both the beam report occasion 720 and the beam report occasion 730 occur during the active duration 710.

A UE 115 may be configured to transmit a beam report during a time period either before the active duration 710 or during the active duration 710 based at least in a part on one or more conditions. For example, a UE 115 may be configured to transmit a beam report before the active duration 710 if a condition is satisfied. Otherwise, the UE 115 may be configured to transmit the beam report during the active duration 710. A UE 115 performing beam measurement and reporting as described with reference to FIG. 7 may thus experience power saving by performing the beam reporting before the active duration 710 or during the active duration 710 based at least in a part on one or more conditions.

In some examples, a UE 115 (e.g., the UE 115-*b* with reference to FIG. 2) may determine that a first beam quality of a first beam and a second beam quality of a second beam based at least in part on a set of beam measurements. The first beam may include a current beam used by the UE 115. In some examples, a condition may be that the UE 115 determines that one or more of the first beam quality of the first beam or the second beam quality of the second beam satisfies a threshold. In other words, the UE 115 determines that there is another beam with a better quality than a current beam used by the UE 115. If the UE 115 determines that there is another beam with a better quality than a current beam used by the UE 115, the UE 115 may transmit a beam report before the active duration 710. Otherwise, the UE 115 may transmit a beam report during the active duration 710. Additionally or alternatively, a condition may be that the UE 115 determines that a beam quality for the first beam or the second beam is above or below the threshold. If the UE 115 determines that the beam quality for the first beam or the second beam is above or below the threshold, the UE 115 may transmit a beam report before the active duration 710. Otherwise, the UE 115 may transmit a beam report during the active duration 710.

In some other examples, a UE 115 (e.g., the UE 115-*b* with reference to FIG. 2) may determine a quantity of transmission failures between the UE 115 and one or more of the other UEs 115 (e.g., the UE 115-*a* or the UE 115-*c* with reference to FIG. 2) satisfies a threshold. In some examples, a condition may be that the UE 115 determines that the quantity of transmission failures is greater than the threshold. In other words, the UE 115 determines that a number of accumulated transmission failures between the UE 115 (e.g., the UE 115-*b* with reference to FIG. 2) and another UE 115 (e.g., the UE 115-*a* or the UE 115-*c* with reference to FIG. 2) within a period of time is greater than a threshold. If the UE 115 determines that the number of accumulated transmission failures between the UE 115 (e.g., the UE 115-*b* with reference to FIG. 2) and another UE 115 (e.g., the UE 115-*a* or the UE 115-*c* with reference to FIG. 2) within the period of time is greater than the threshold, the UE 115 may transmit a beam report before the active duration 710. Otherwise, the UE 115 may transmit a beam report during the active duration 710.

In other examples, a UE 115 (e.g., the UE 115-*b* with reference to FIG. 2) may determine that a change in a metric (e.g., a channel quality, a reference signal received power (RSRP), a signal to noise interference (SINR), etc.) associated with a beam satisfies a threshold based at least in part on a beam measurement of the beam. In some examples, a condition may be that the UE 115 determines that the change is greater than the threshold. If the UE 115 determines that the change is greater than the threshold, the UE 115 may transmit a beam report before the active duration 710. Otherwise, the UE 115 may transmit a beam report during the active duration 710.

In some other examples, a UE 115 (e.g., the UE 115-*b* with reference to FIG. 2) may determine that a beam failure count satisfies a threshold. In some examples, a condition may be that the UE 115 determines that a count of beam failure instances (also referred to as beam failure indicator (BFI) count sidelink) is greater than a threshold (e.g., a beam failure report count) but smaller than a maximum beam failure instance count, which declares a beam failure. The BFI count sidelink may include events based on periodic and aperiodic BFI reference signals if aperiodic reference signals are used. If the UE 115 determines that the count of beam failure instances is greater than the threshold but smaller than the maximum beam failure instance count, the UE 115 may transmit a beam report before the active duration 710. Otherwise, the UE 115 may transmit a beam report during the active duration 710.

In other examples, a UE 115 (e.g., the UE 115-*b* with reference to FIG. 2) may receive a request for a beam report, for example, from a base station 105 (e.g., the base station 105-*a* with reference to FIG. 2) or another UE 115 (e.g., the UE 115-*a* or the UE 115-*c* with reference to FIG. 2). In some examples, a condition may be that the UE 115 receives the request for the beam report. If the UE 115 receives the request for the beam report, the UE 115 may transmit a beam report before the active duration 710. Otherwise, the UE 115 may transmit a beam report during the active duration 710.

Therefore, a UE 115 performing beam measurement and reporting as described with reference to FIG. 7 may experience power saving by performing the beam reporting before or during the active duration 710 based at least in part on one or more conditions.

Figure 8:
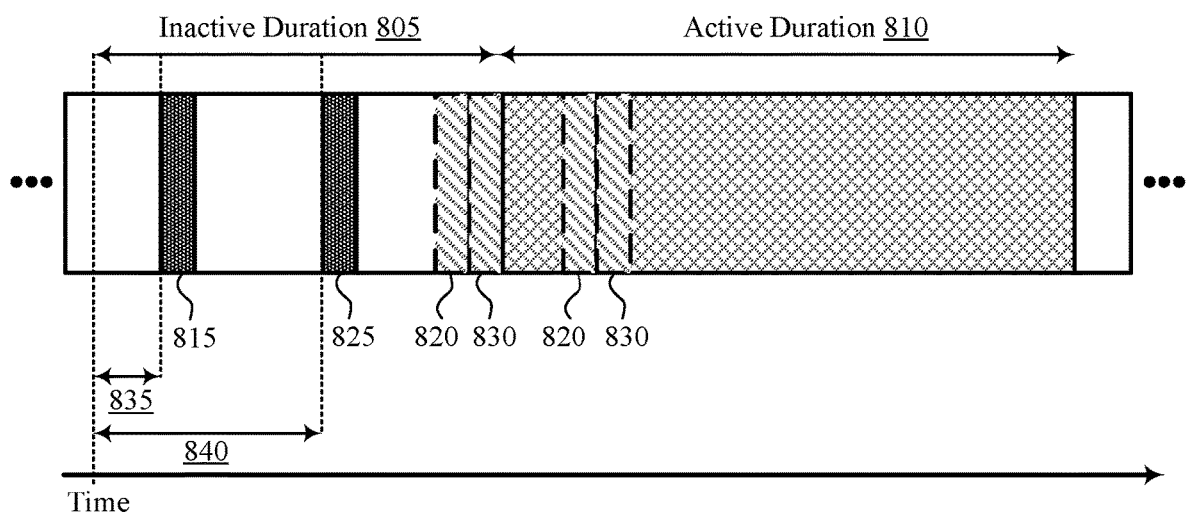
Figure 8:
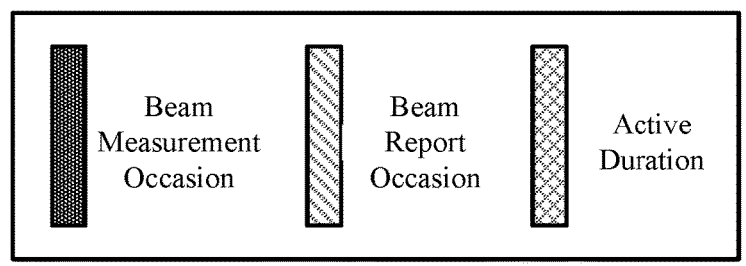

FIG. 8 illustrates an example of a timeline 800 that supports techniques for beam measurement reporting in accordance with one or more aspects of the present disclosure. The timeline 800 may implement aspects of the wireless communications systems 100 and 200, or may be implemented by aspects of the wireless communications systems 100 and 200, as described with reference to FIGS. 1 and 2, respectively. For example, the timeline 800 may be based on a configuration by a base station 105, which may be implemented by a UE 115 to provide power saving for the UE 115. Alternatively, the timeline 800 may be based on a configuration by a UE 115, which may be implemented by the UE 115 to promote high reliability and low latency wireless communications (e.g., sidelink communications).

A UE 115 may support DRX operations in which the UE 115 may enter an inactive state (e.g., power-down during an inactive duration 805 (also referred to as an OFF duration) of a DRX cycle) and stop monitoring of control or data channels (e.g., a sidelink data channel, a sidelink control channel, etc.), as well as enter an active state (e.g., power-up during an active duration 810 (also referred to as an ON duration) of a DRX cycle) to monitor the control or data channels to receive control information (e.g., sidelink control information) or data (e.g., sidelink data).

A UE 115 may be configured with one or more parameters, which may define an offset and a period of a DRX cycle. An offset may correspond to the inactive duration 805, which may be a delay period before the active duration 810.

The UE 115 may be configured via a control message, which may include a parameter indicating the delay period. For example, the parameter may be a sidelink DRX offset duration (also referred to as sl-drx-slot offset), which indicate the delay period before a beginning of the active duration 810. A period of a DRX cycle may correspond to the active duration 810. The UE 115 may be configured via a control message, which may include a parameter indicating a timer (also referred to as sl-drx-ON duration timer), which the UE 115 may activate at the beginning of the active duration 810.

In the example of FIG. 8, a UE 115 (e.g., the UE 115-*b* with reference to FIG. 2) may perform a set of beam measurements based at least in part on a beam measurement occasion before the active duration 810. For example, a UE 115 may perform a set of beam measurements on a set of reference beams (e.g., the set of reference beams 205-*a* with reference to FIG. 2) received from another UE 115 (e.g., the UE 115-*a* with reference to FIG. 2) based at least in part on a beam measurement occasion 815 before the active duration 810. In some examples, the UE 115 may perform the set of beam measurements based at least in part on an offset 835 (also referred to as a sidelink beam measurement offset), which may indicate a delay period before the UE 115 begins the set of beam measurements. Additionally or alternatively, a UE 115 may perform another set of beam measurements on an additional set of reference beams (e.g., the additional set of reference beams 205-*b* with reference to FIG. 2) received from another UE 115 (e.g., the UE 115-*c* with reference to FIG. 2) based at least in part on a beam measurement occasion 825 before the active duration 810. In some examples, the UE 115 may perform the other set of beam measurements based at least in part on an offset 840 (also referred to as a sidelink beam measurement offset), which may indicate a delay period before the UE 115 begins the other set of beam measurements.

The UE 115 may transmit a beam measurement report to the other UE 115 based at least in part on a beam report occasion 820. Similarly, the UE 115 may transmit a beam measurement report to the other UE 115 based at least in part on a beam report occasion 830. The UE 115 may transmit a beam measurement report on one or more sidelink resources in one or more of a time domain (e.g., symbols, slots, subframes, frames) or a frequency domain (e.g., subcarriers, carriers). In some examples, a base station 105 (e.g., the base station 105-*a* with reference to FIG. 2) or another UE 115 (e.g., the UE 115-*a* with reference to FIG. 2) may transmit a grant allocating the one or more sidelink resources for the UE 115 to use for the beam measurement report. In some other examples, the one or more sidelink resources may be preconfigured via RRC configuration. In other examples, the UE 115 may perform a contention procedure to contend a sidelink for the one or more sidelink resources.

As illustrated in FIG. 8, the beam report occasion 820 may be nonadjacent to the beam measurement occasion 815. Likewise, the beam report occasion 830 may be nonadjacent to the beam measurement occasion 825. Here, both the beam report occasion 820 and the beam report occasion 830 occur before the active duration 810, for example, at an ending of the inactive duration 805 and before the active duration 810. Alternatively, as illustrated in FIG. 8, both the beam report occasion 820 and the beam report occasion 830 occur during the active duration 810. A UE 115 may be configured to transmit a beam report either before the active duration 810 or during the active duration 810 based at least in a part on one or more conditions as described with reference to FIG. 7. Therefore, a UE 115 performing beam measurement and reporting as described with reference to FIG. 8 may experience power saving by performing the beam reporting before or during the active duration 810 based at least in part on one or more conditions.

Figure 9:
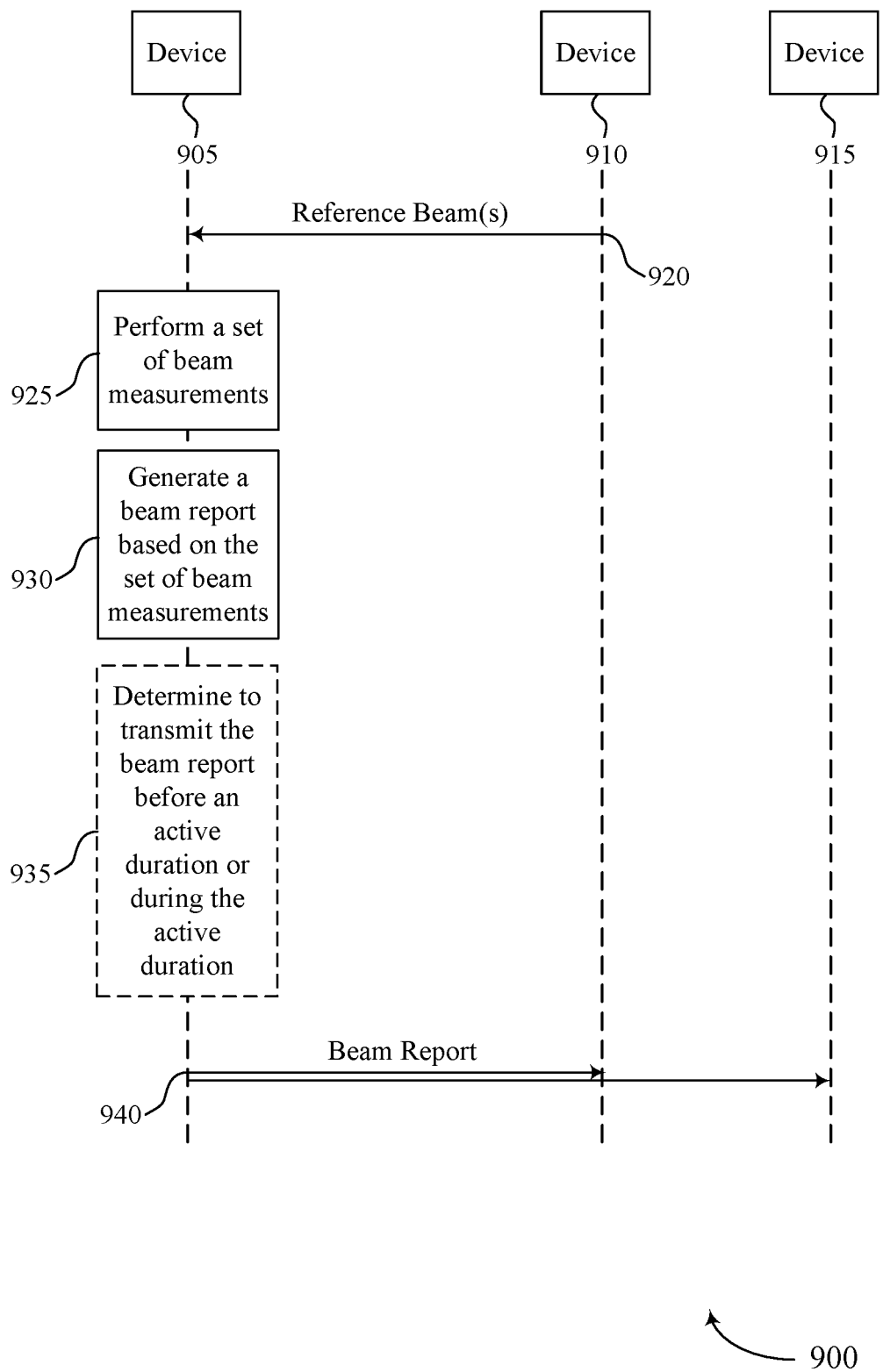
FIG. 9 illustrates an example of a process flow that supports techniques for beam measurement reporting in accordance with one or more aspects of the present disclosure.

FIG. 9 illustrates an example of a process flow 900 that supports techniques for beam measurement reporting in accordance with one or more aspects of the present disclosure. The process flow 900 may implement aspects of the wireless communications systems 100 and 200 or may be implemented by aspects of the wireless communications systems 100 and 200 as described with reference to FIGS. 1 and 2, respectively. For example, the process flow 900 may be based on a configuration by a base station 105, which may be implemented by a UE 115. One or more of a device 905, a device 910, and a device 915 may be examples of a base station 105 or a UE 115, as described with reference to FIGS. 1 through 8.

In the example of FIG. 9, one or more of the device 905, the device 910, and the device 915 may perform wireless communications including sidelink communications. In the following description of the process flow 900, the operations between one or more of the device 905, the device 910, and the device 915 may be transmitted in a different order than the example order shown, or the operations performed by one or more of the device 905, the device 910, and the device 915 may be performed in different orders or at different times. Some operations may also be omitted from the process flow 900, and other operations may be added to the process flow 900.

At 920, the device 910 (e.g., the UE 115-*a* with reference to FIG. 2) may transmit a set of reference beams to the device 905 (e.g., the UE 115-*b* with reference to FIG. 2). At 925, the device 905 may perform a set of beam measurements, for example, based on the received set of reference beams from the device 910. At 930, the device 905 may generate a beam report based on the set of beam measurements. At 935, the device 905 may determine to transmit the beam report before an active duration or during the active duration as described with reference to FIGS. 3 through 8. At 940, the device 905 may transmit the beam report to one or more of the device 910 or the device 915 as described with reference to FIGS. 3 through 8.

Figure 10:
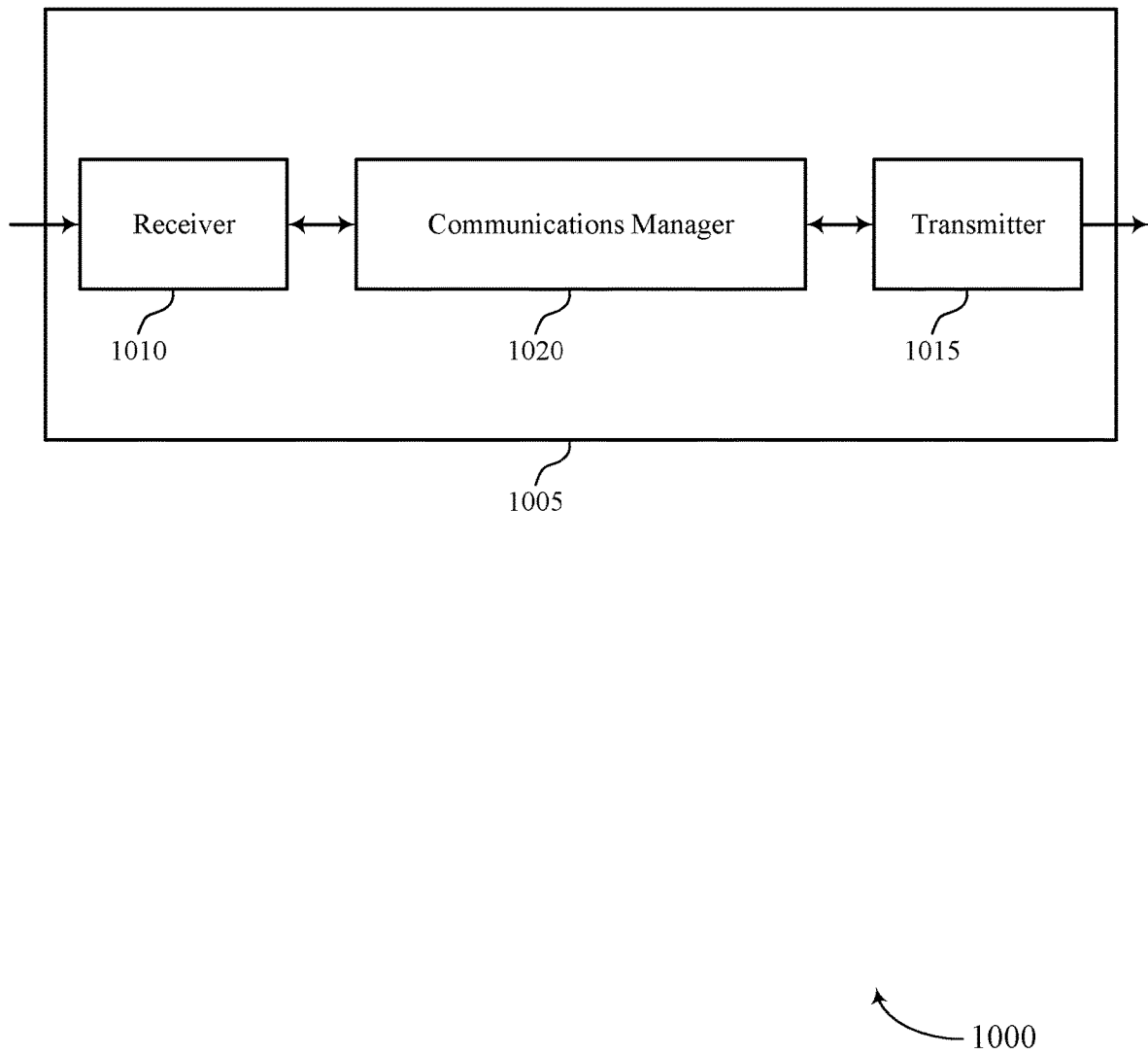
FIGS. 10 and 11 show block diagrams of devices that support techniques for beam measurement reporting in accordance with one or more aspects of the present disclosure.

FIG. 10 shows a block diagram 1000 of a device 1005 that supports techniques for beam measurement reporting in accordance with one or more aspects of the present disclosure. The device 1005 may be an example of aspects of one or more of a base station 105 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for beam measurement reporting). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for beam measurement reporting). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for beam measurement reporting as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 in accordance with examples as disclosed herein. For example, the communications manager 1020 may be configured as or otherwise support a means for receiving control signaling indicating a sidelink beam reporting resource configuration. The communications manager 1020 may be configured as or otherwise support a means for receiving a set of reference beams from a second device (e.g., a UE 115) over a sidelink. The communications manager 1020 may be configured as or otherwise support a means for transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

Additionally or alternatively, the communications manager 1020 may support wireless communication at the device 1005 (e.g., one or more of a base station 105 or a UE 115) in accordance with examples as disclosed herein. For example, the communications manager 1020 may be configured as or otherwise support a means for transmitting control signaling indicating a sidelink beam reporting resource configuration. The communications manager 1020 may be configured as or otherwise support a means for transmitting a set of reference beams to a second device (e.g., a UE 115). The communications manager 1020 may be configured as or otherwise support a means for receiving a beam measurement report from the second device in accordance with the sidelink beam reporting resource configuration and during at least one of a time period before an active duration, a time period during the active duration, or a combination thereof.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for power saving. The described techniques may, as a result, also may promote high reliability and low latency sidelink communications.

Figure 11:
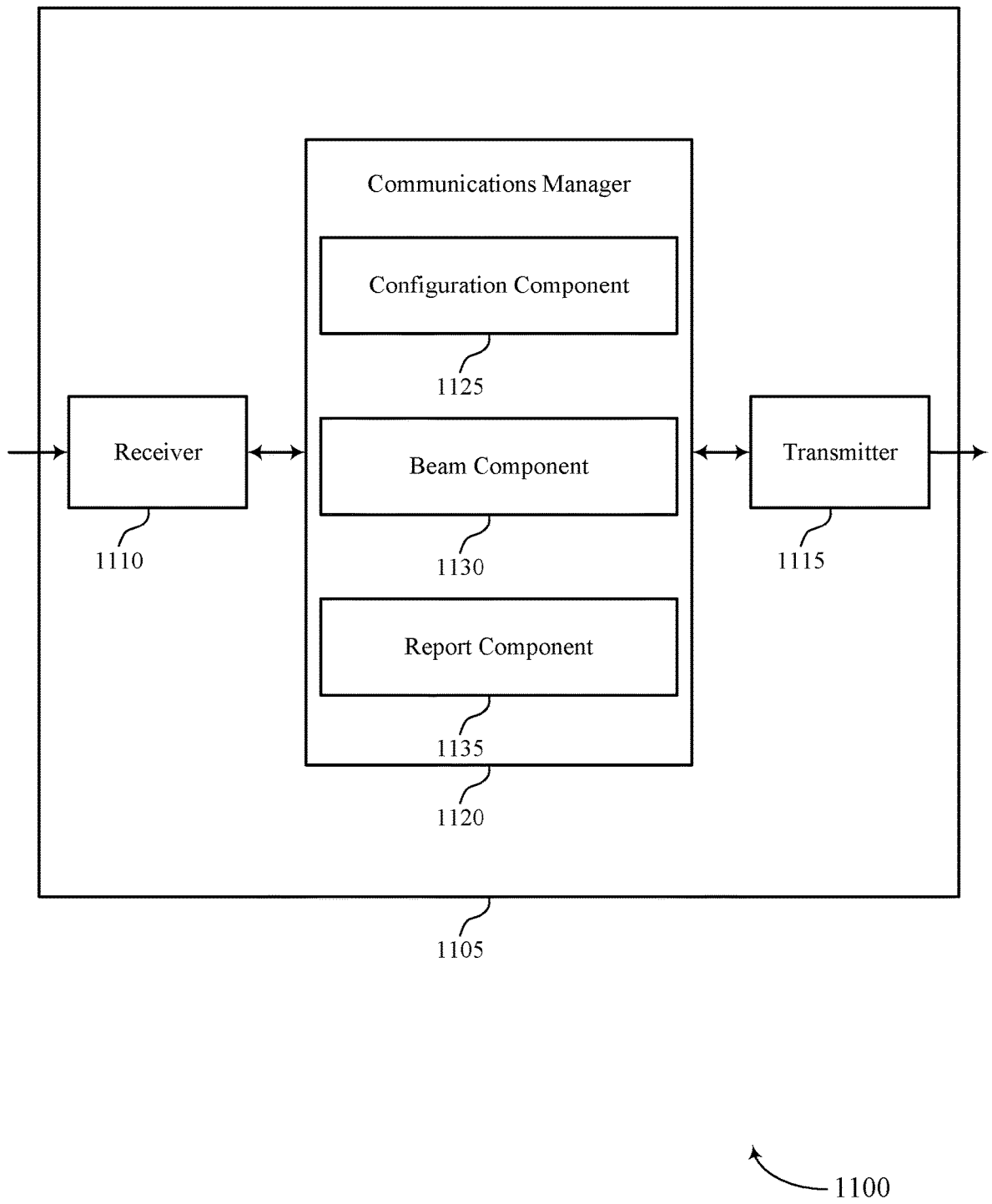

FIG. 11 shows a block diagram 1100 of a device 1105 that supports techniques for beam measurement reporting in accordance with one or more aspects of the present disclosure. The device 1105 may be an example of aspects of a device 1005 or one or more of a base station 105 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for beam measurement reporting). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for beam measurement reporting). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for beam measurement reporting as described herein. For example, the communications manager 1120 may include a configuration component 1125, a beam component 1130, a report component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., one or more of a base station 105 or a UE 115) in accordance with examples as disclosed herein. The configuration component 1125 may be configured as or otherwise support a means for receiving control signaling indicating a sidelink beam reporting resource configuration. The beam component 1130 may be configured as or otherwise support a means for receiving a set of reference beams from a second device (e.g., a UE 115) over a sidelink. The report component 1135 may be configured as or otherwise support a means for transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

Additionally or alternatively, the communications manager 1120 may support wireless communication at the device 1105 (e.g., one or more of a base station 105 or a UE 115) in accordance with examples as disclosed herein. The configuration component 1125 may be configured as or otherwise support a means for transmitting control signaling indicating a sidelink beam reporting resource configuration. The beam component 1130 may be configured as or otherwise support a means for transmitting a set of reference beams to a second device (e.g., a UE 115). The report component 1135 may be configured as or otherwise support a means for receiving a beam measurement report from the second device in accordance with the sidelink beam reporting resource configuration and during at least one of a time period before an active duration, a time period during the active duration, or a combination thereof.

Figure 12:
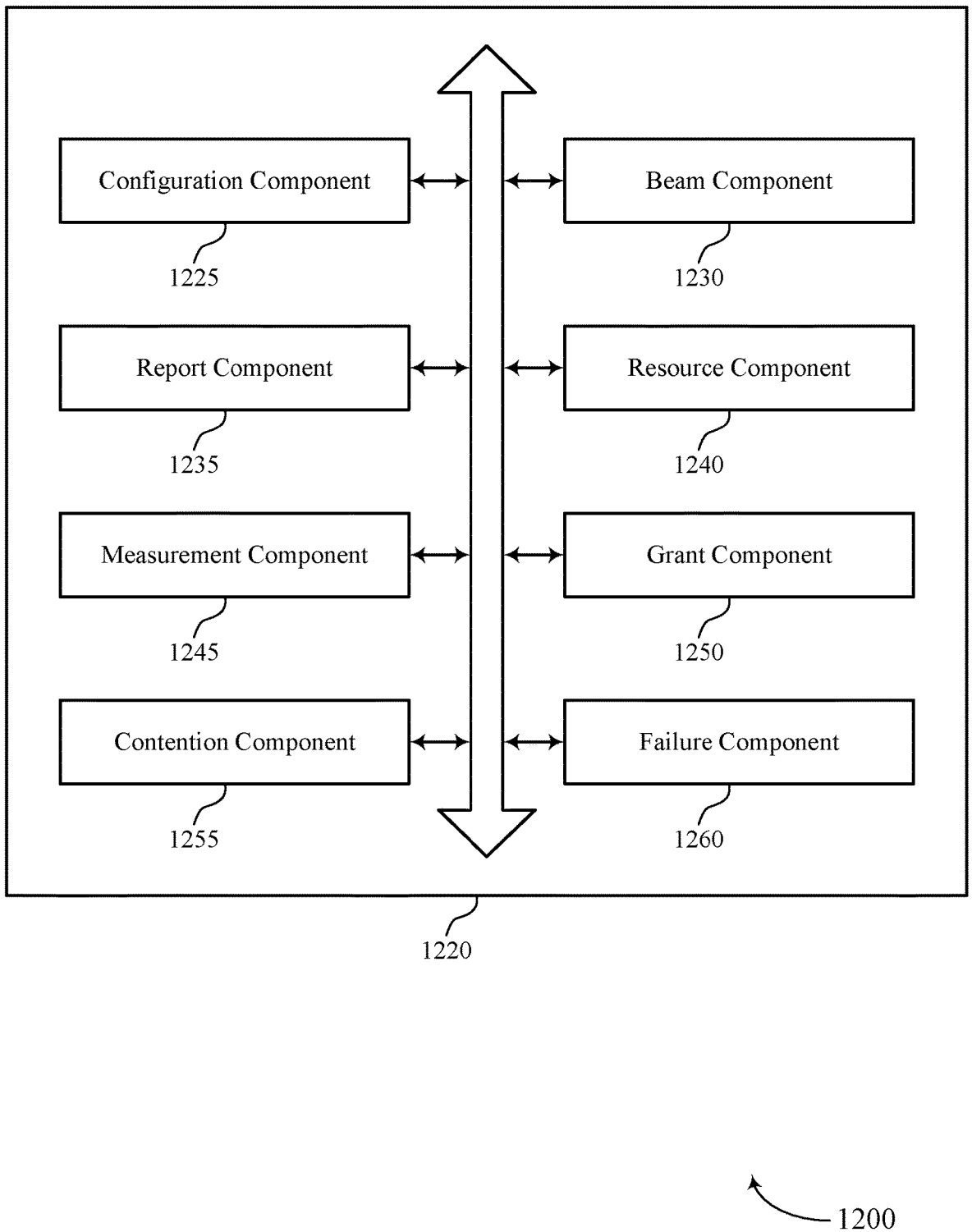
FIG. 12 shows a block diagram of a communications manager that supports techniques for beam measurement reporting in accordance with one or more aspects of the present disclosure.

FIG. 12 shows a block diagram 1200 of a communications manager 1220 that supports techniques for beam measurement reporting in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for beam measurement reporting as described herein. For example, the communications manager 1220 may include a configuration component 1225, a beam component 1230, a report component 1235, a resource component 1240, a measurement component 1245, a grant component 1250, a contention component 1255, a failure component 1260, or any combination thereof. Each of these components may communicate, directly or indirectly, with one another (e.g., via one or more buses).

The communications manager 1220 may support wireless communication at a first device (e.g., one or more of a base station 105 or a UE 115) in accordance with examples as disclosed herein. The configuration component 1225 may be configured as or otherwise support a means for receiving control signaling indicating a sidelink beam reporting resource configuration. The beam component 1230 may be configured as or otherwise support a means for receiving a set of reference beams from a second device (e.g., a UE 115) over a sidelink. The report component 1235 may be configured as or otherwise support a means for transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

The resource component 1240 may be configured as or otherwise support a means for determining a set of sidelink resources based on the sidelink beam reporting resource configuration. In some examples, the report component 1235 may be configured as or otherwise support a means for transmitting the beam measurement report to the second device on the set of sidelink resources. In some examples, the measurement component 1245 may be configured as or otherwise support a means for performing the set of beam measurements based on a beam measurement occasion during at least one of the time period before the active duration. In some examples, the report component 1235 may be configured as or otherwise support a means for transmitting, in response to the set of beam measurements, the beam measurement report to the second device based on a beam report occasion during at least one of the time period before the active duration. In some examples, the beam measurement occasion and the beam report occasion are contiguous in a time domain. In some examples, the beam measurement occasion and the beam report occasion are noncontiguous in a time domain. In some examples, one or more of a beam measurement occasion or a beam report occasion occur during at least one of the time period before the active duration, the time period during the active duration, or a combination thereof.

In some examples, the report component 1235 may be configured as or otherwise support a means for grouping a set of beam measurement reports associated with a set of devices including one or more of the first device or the second device. In some examples, the report component 1235 may be configured as or otherwise support a means for generating the beam measurement report based on the grouping of the set of beam measurement reports associated with the set of devices. In some examples, the report component 1235 may be configured as or otherwise support a means for transmitting the beam measurement report to the set of devices over the sidelink based on a beam report occasion during at least one of the time period before the active duration, the time period during the active duration, or a combination thereof.

In some examples, the report component 1235 may be configured as or otherwise support a means for transmitting a set of beam measurement reports associated with a set of devices including one or more of the first device or the second device over the sidelink based on a set of beam report occasions during at least one of the time period before the active duration, the time period during the active duration, or a combination thereof. In some examples, the measurement component 1245 may be configured as or otherwise support a means for performing the set of beam measurements based on a beam measurement occasion during at least one of the time period before the active duration, the time period during the active duration, or a combination thereof. In some examples, the report component 1235 may be configured as or otherwise support a means for transmitting, in response to the set of beam measurements, the beam measurement report to the second device based on a beam report occasion during at least one of the time period during the active duration.

In some examples, the report component 1235 may be configured as or otherwise support a means for transmitting, in response to a contention procedure to access the sidelink, the beam measurement report to the second device based on a beam report occasion during at least one of the time period before the active duration, the time period during the active duration, or a combination thereof. In some examples, the report component 1235 may be configured as or otherwise support a means for transmitting the beam measurement report to the second device during at least one of the time period before the active duration, the time period during the active duration, or a combination thereof, based on a condition.

The beam component 1230 may be configured as or otherwise support a means for determining a first beam quality of a first beam and a second beam quality of a second beam based on the set of beam measurements, the first beam including a current beam used by the first device for the wireless communication. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on determining the first beam quality of the first beam and the second beam quality of the second beam. In some examples, the beam component 1230 may be configured as or otherwise support a means for determining one or more of the first beam quality of the first beam or the second beam quality of the second beam satisfying a threshold. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on determining one or more of the first beam quality of the first beam or the second beam quality of the second beam satisfying the threshold.

In some examples, the failure component 1260 may be configured as or otherwise support a means for determining a quantity of transmission failures between the first device and the second device satisfying a threshold. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on determining the quantity of transmission failures satisfying the threshold. In some examples, the failure component 1260 may be configured as or otherwise support a means for determining a beam failure count associated with the wireless communication satisfying a threshold. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on determining the beam failure count associated with the wireless communication satisfying the threshold.

In some examples, the report component 1235 may be configured as or otherwise support a means for receiving a request for the beam measurement report from the second device or a third device, the second device including a user equipment and the third device including a base station. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on receiving the request for the beam measurement report. In some examples, the grant component 1250 may be configured as or otherwise support a means for receiving a grant allocating a set of sidelink resources for transmitting the beam measurement report to the second device during at least one of the time period before the active duration, the time period during the active duration, or a combination thereof.

In some examples, the contention component 1255 may be configured as or otherwise support a means for performing a contention procedure associated with a sidelink for a set of sidelink resources for transmitting the beam measurement report to the second device during at least one of the time period before the active duration, the time period during the active duration, or a combination thereof. In some examples, the report component 1235 may be configured as or otherwise support a means for transmitting the beam measurement report to the second device in accordance with the sidelink beam reporting resource configuration and during at least one of the time period before the active duration, the time period during the active duration, or a combination thereof, based on performing the contention procedure associated with the sidelink for the set of sidelink resources. In some examples, the first device includes a first UE and the second device includes a second UE or a base station the first device comprising an antenna or an antenna array. In some examples, the wireless communication includes sidelink communication.

Additionally or alternatively, the communications manager 1220 may support wireless communication at a first device in accordance with examples as disclosed herein. In some examples, the configuration component 1225 may be configured as or otherwise support a means for transmitting control signaling indicating a sidelink beam reporting resource configuration. In some examples, the beam component 1230 may be configured as or otherwise support a means for transmitting a set of reference beams to a second device. In some examples, the report component 1235 may be configured as or otherwise support a means for receiving a beam measurement report from the second device in accordance with the sidelink beam reporting resource configuration and during at least one of a time period before an active duration, a time period during the active duration, or a combination thereof.

In some examples, one or more of a beam measurement occasion or a beam report occasion occurs during at least one of the time period before the active duration, the time period during the active duration, or a combination thereof. In some examples, the report component 1235 may be configured as or otherwise support a means for receiving the beam measurement report from the second device based on a beam report occasion during at least one of the time period before the active duration. In some examples, the report component 1235 may be configured as or otherwise support a means for receiving the beam measurement report from the second device based on a beam report occasion during at least one of the time period during the active duration. In some examples, the first device includes a first UE and the second device includes a second UE or a base station the first device comprising an antenna or an antenna array. In some examples, the wireless communication includes sidelink communication.

Figure 13:
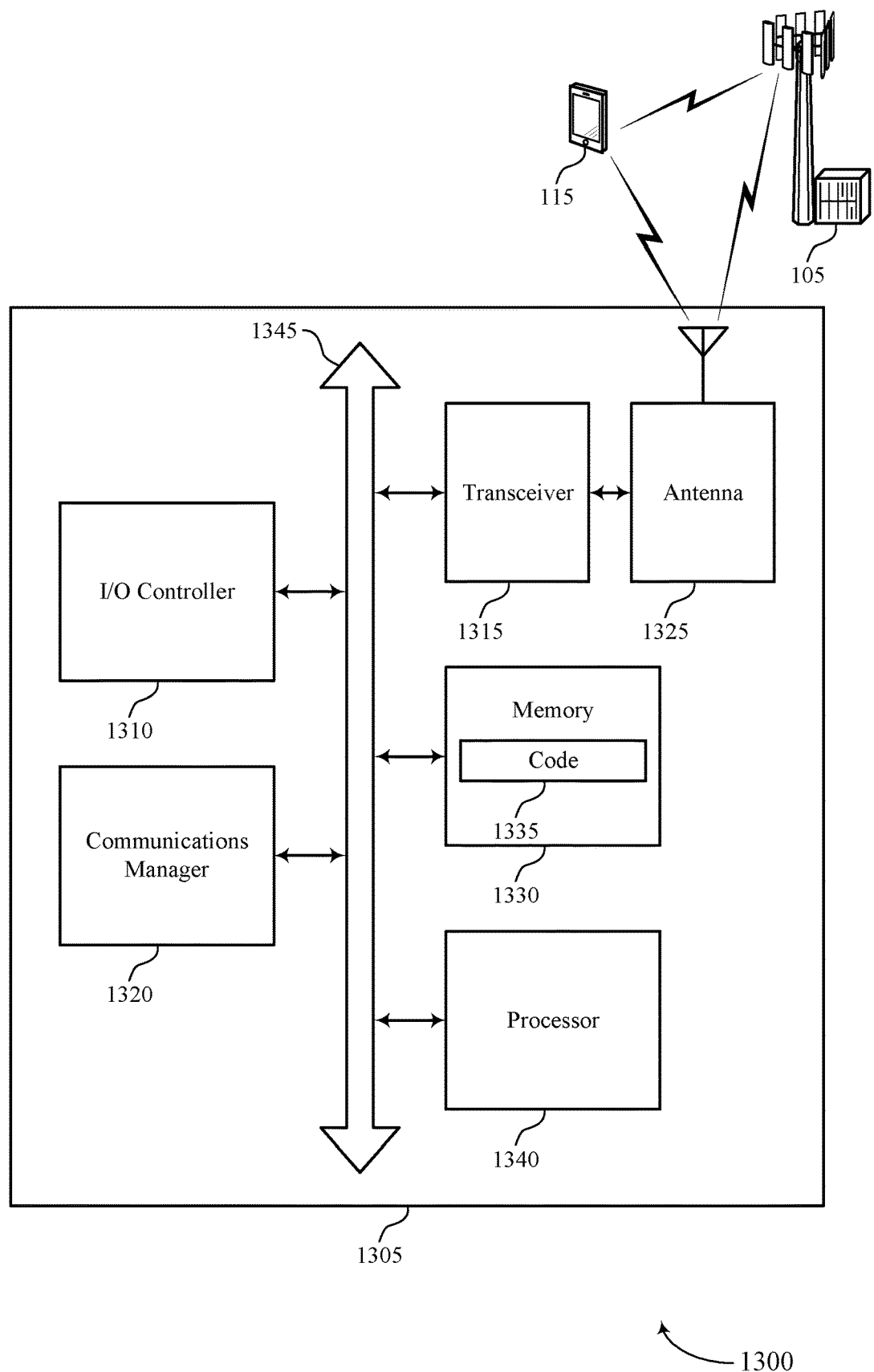
FIG. 13 shows a diagram of a system including a device that supports techniques for beam measurement reporting in accordance with one or more aspects of the present disclosure.

FIG. 13 shows a diagram of a system 1300 including a device 1305 that supports techniques for beam measurement reporting in accordance with one or more aspects of the present disclosure. The device 1305 may be an example of or include the components of a device 1005, a device 1105, or one or more of a base station 105 or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for beam measurement reporting). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a first device in accordance with examples as disclosed herein. For example, the communications manager 1320 may be configured as or otherwise support a means for receiving control signaling indicating a sidelink beam reporting resource configuration. The communications manager 1320 may be configured as or otherwise support a means for receiving a set of reference beams from a second device over a sidelink. The communications manager 1320 may be configured as or otherwise support a means for transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams.

Additionally or alternatively, the communications manager 1320 may support wireless communication at a first device in accordance with examples as disclosed herein. For example, the communications manager 1320 may be configured as or otherwise support a means for transmitting control signaling indicating a sidelink beam reporting resource configuration. The communications manager 1320 may be configured as or otherwise support a means for transmitting a set of reference beams to a second device. The communications manager 1320 may be configured as or otherwise support a means for receiving a beam measurement report from the second device in accordance with the sidelink beam reporting resource configuration and during at least one of a time period before an active duration, a time period during the active duration, or a combination thereof.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for beam measurement reporting as described herein, or the processor 1340 and the memory 1330 may be otherwise configured to perform or support such operations.

Figure 14:
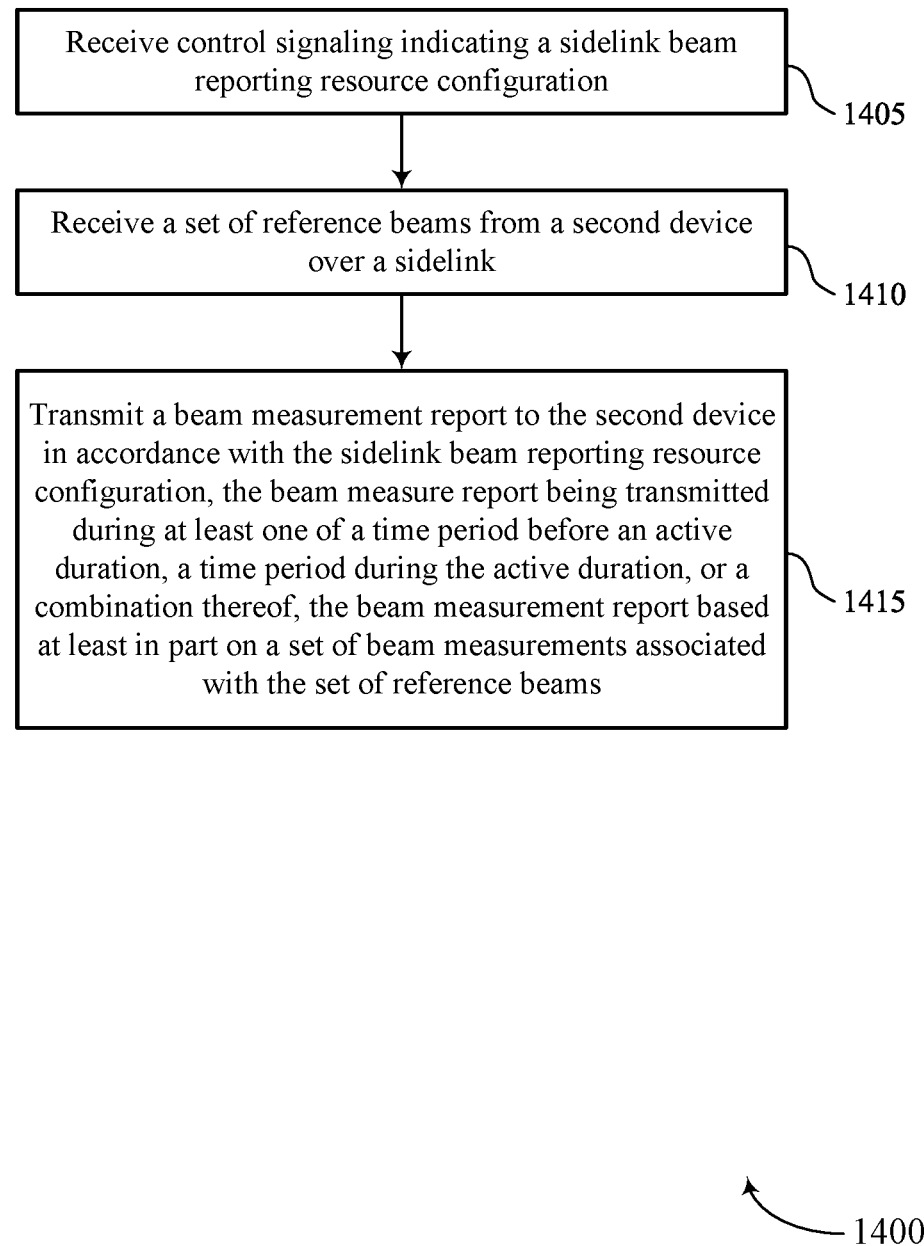
FIGS. 14 through 19 show flowcharts illustrating methods that support techniques for beam measurement reporting in accordance with one or more aspects of the present disclosure.

FIG. 14 shows a flowchart illustrating a method 1400 that supports techniques for beam measurement reporting in accordance with one or more aspects of the present disclosure. The operations of the method 1400 may be implemented by one or more of a base station 105 or a UE 115 or its components as described herein. For example, the operations of the method 1400 may be performed by one or more of a base station 105 or a UE 115 as described with reference to FIGS. 1 through 13. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1405, the method may include receiving control signaling indicating a sidelink beam reporting resource configuration. The operations of 1405 may be performed in accordance with examples as disclosed herein. In some examples, aspects of the operations of 1405 may be performed by a configuration component 1225 as described with reference to FIG. 12.

At 1410, the method may include receiving a set of reference beams from a second device over a sidelink. The operations of 1410 may be performed in accordance with examples as disclosed herein. In some examples, aspects of the operations of 1410 may be performed by a beam component 1230 as described with reference to FIG. 12.

At 1415, the method may include transmitting a beam measurement report to the second device in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams. The operations of 1415 may be performed in accordance with examples as disclosed herein. In some examples, aspects of the operations of 1415 may be performed by a report component 1235 as described with reference to FIG. 12.

Figure 15:
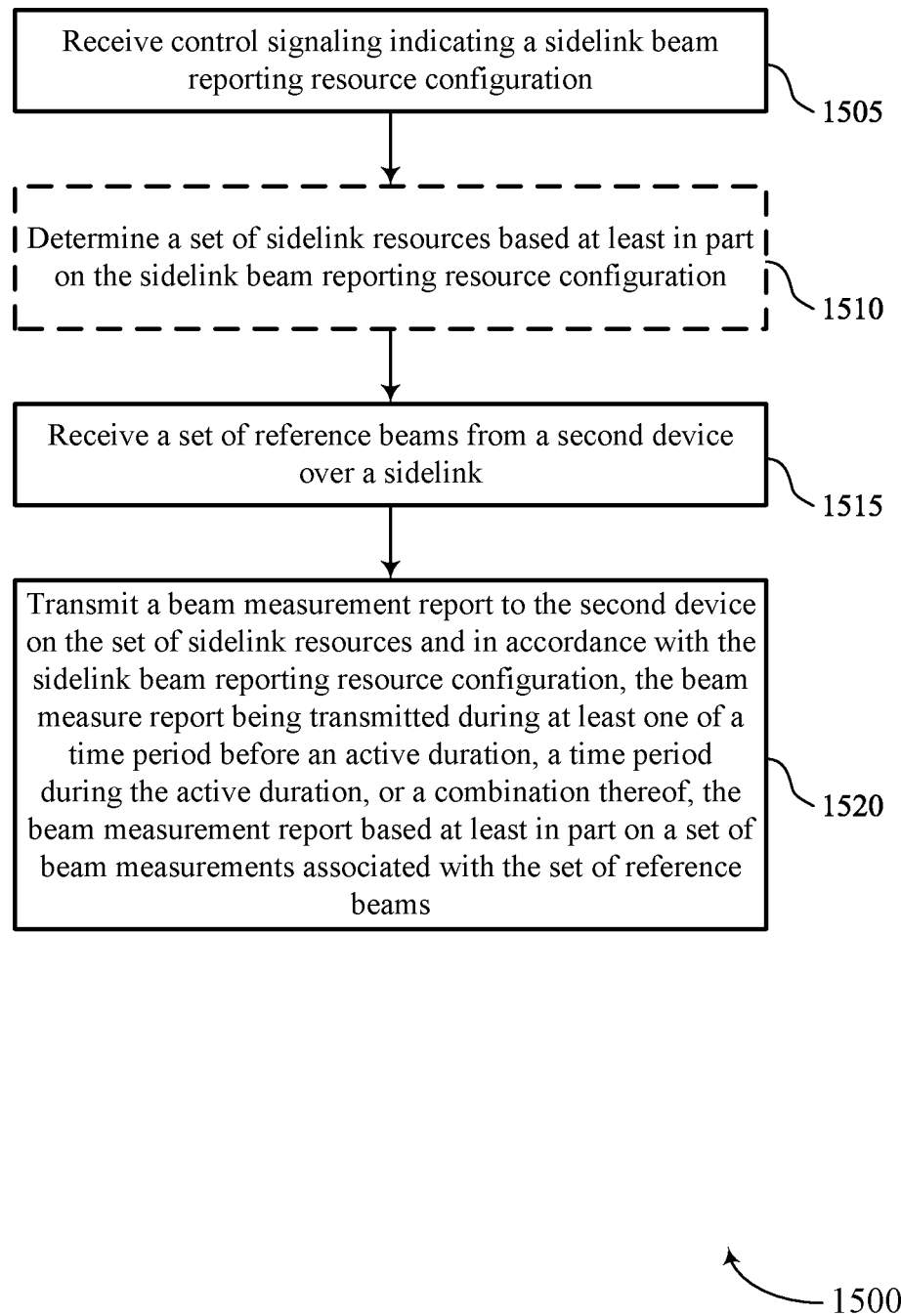

FIG. 15 shows a flowchart illustrating a method 1500 that supports techniques for beam measurement reporting in accordance with one or more aspects of the present disclosure. The operations of the method 1500 may be implemented by one or more of a base station 105 or a UE 115 or its components as described herein. For example, the operations of the method 1500 may be performed by one or more of a base station 105 or a UE 115 as described with reference to FIGS. 1 through 13. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1505, the method may include receiving control signaling indicating a sidelink beam reporting resource configuration. The operations of 1505 may be performed in accordance with examples as disclosed herein. In some examples, aspects of the operations of 1505 may be performed by a configuration component 1225 as described with reference to FIG. 12.

At 1510, the method may include determining a set of sidelink resources based on the sidelink beam reporting resource configuration. The operations of 1510 may be performed in accordance with examples as disclosed herein. In some examples, aspects of the operations of 1510 may be performed by a resource component 1240 as described with reference to FIG. 12.

At 1515, the method may include receiving a set of reference beams from a second device over a sidelink. The operations of 1515 may be performed in accordance with examples as disclosed herein. In some examples, aspects of the operations of 1515 may be performed by a beam component 1230 as described with reference to FIG. 12.

At 1520, the method may include transmitting a beam measurement report to the second device on the set of sidelink resources and in accordance with the sidelink beam reporting resource configuration, the beam measurement report being transmitted during at least one of a time period before an active duration, a time period during the active duration, or a combination thereof, the beam measurement report based on a set of beam measurements associated with the set of reference beams. The operations of 1520 may be performed in accordance with examples as disclosed herein. In some examples, aspects of the operations of 1520 may be performed by a report component 1235 as described with reference to FIG. 12.

At 1525, the method may include transmitting the beam measurement report to the second device on the set of sidelink resources. The operations of 1525 may be performed in accordance with examples as disclosed herein. In some examples, aspects of the operations of 1525 may be performed by a report component 1235 as described with reference to FIG. 12.

Figure 16:
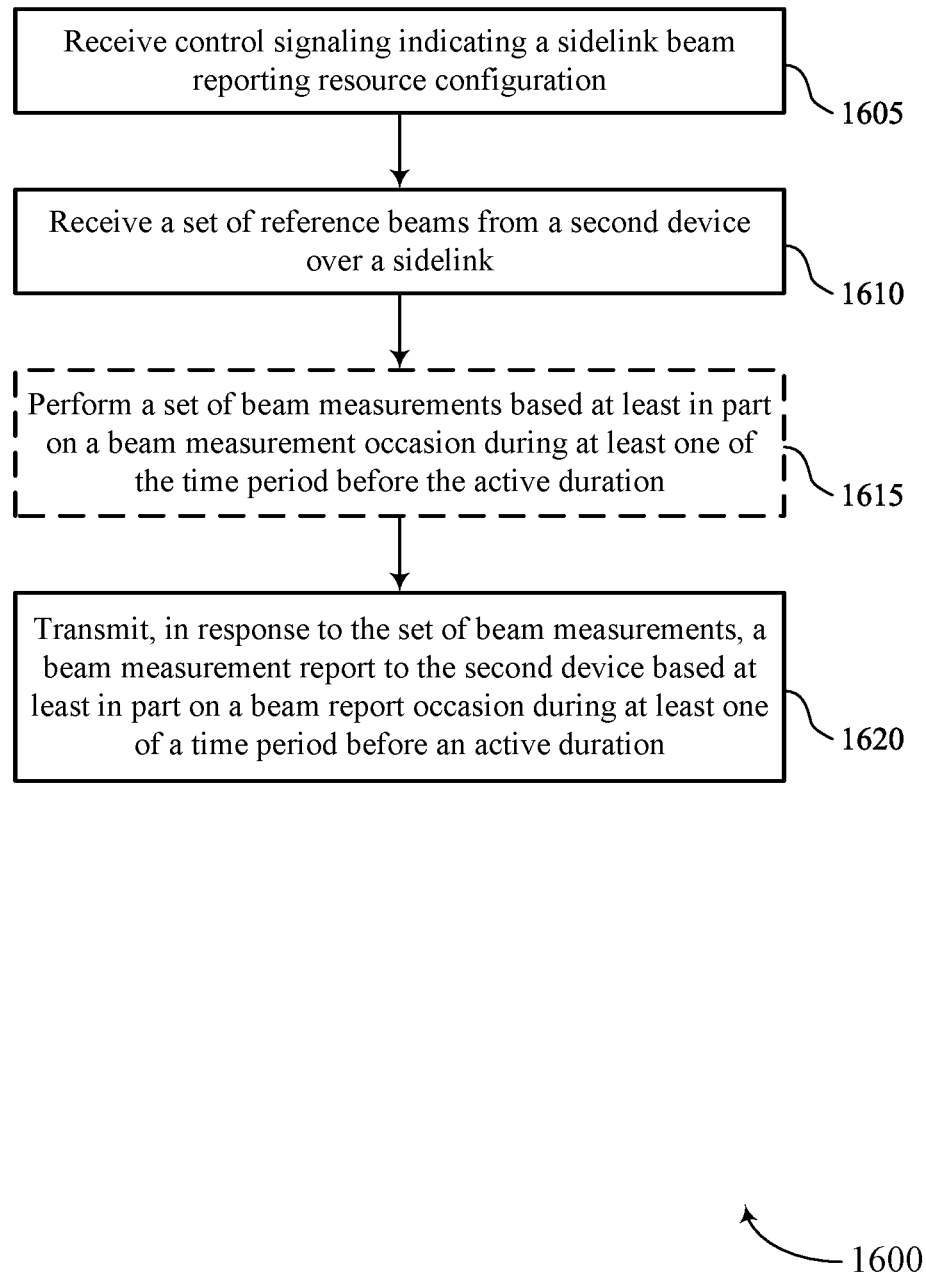

FIG. 16 shows a flowchart illustrating a method 1600 that supports techniques for beam measurement reporting in accordance with one or more aspects of the present disclosure. The operations of the method 1600 may be implemented by a UE or its components as described herein. For example, the operations of the method 1600 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1605, the method may include receiving control signaling indicating a sidelink beam reporting resource configuration. The operations of 1605 may be performed in accordance with examples as disclosed herein. In some examples, aspects of the operations of 1605 may be performed by a configuration component 1225 as described with reference to FIG. 12.

At 1610, the method may include receiving a set of reference beams from a second device over a sidelink. The operations of 1610 may be performed in accordance with examples as disclosed herein. In some examples, aspects of the operations of 1610 may be performed by a beam component 1230 as described with reference to FIG. 12.

At 1615, the method may include performing a set of beam measurements based at least in part on a beam measurement occasion during at least one of the time period before the active duration. The operations of 1615 may be performed in accordance with examples as disclosed herein. In some examples, aspects of the operations of 1615 may be performed by a measurement component 1245 as described with reference to FIG. 12.

At 1620, the method may include transmitting, in response to the set of beam measurements, a beam measurement report to the second device based at least in part on a beam report occasion during at least one of a time period before an active duration. The operations of 1620 may be performed in accordance with examples as disclosed herein. In some examples, aspects of the operations of 1620 may be performed by a report component 1235 as described with reference to FIG. 12.

Figure 17:
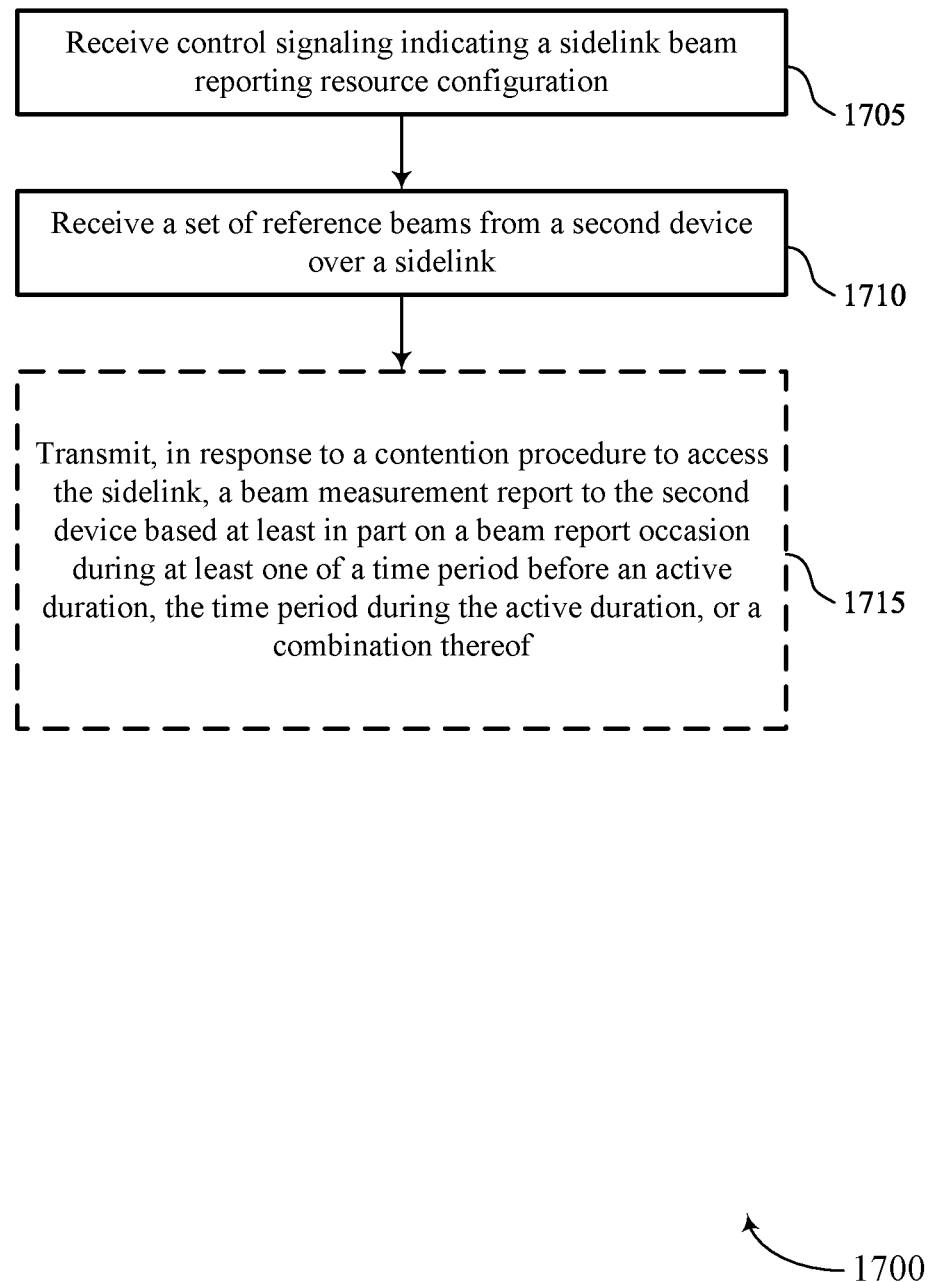

FIG. 17 shows a flowchart illustrating a method 1700 that supports techniques for beam measurement reporting in accordance with one or more aspects of the present disclosure. The operations of the method 1700 may be implemented by one or more of a base station 105 or a UE 115 or its components as described herein. For example, the operations of the method 1700 may be performed by one or more of a base station 105 or a UE 115 as described with reference to FIGS. 1 through 13. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1705, the method may include receiving control signaling indicating a sidelink beam reporting resource configuration. The operations of 1705 may be performed in accordance with examples as disclosed herein. In some examples, aspects of the operations of 1705 may be performed by a configuration component 1225 as described with reference to FIG. 12.

At 1710, the method may include receiving a set of reference beams from a second device over a sidelink. The operations of 1710 may be performed in accordance with examples as disclosed herein. In some examples, aspects of the operations of 1710 may be performed by a beam component 1230 as described with reference to FIG. 12.

At 1715, the method may include transmitting, in response to a contention procedure to access the sidelink, a beam measurement report to the second device based at least in part on a beam report occasion during at least one of a time period before an active duration, the time period during the active duration, or a combination thereof. The operations of 1715 may be performed in accordance with examples as disclosed herein. In some examples, aspects of the operations of 1715 may be performed by a report component 1235 as described with reference to FIG. 12.

Figure 18:
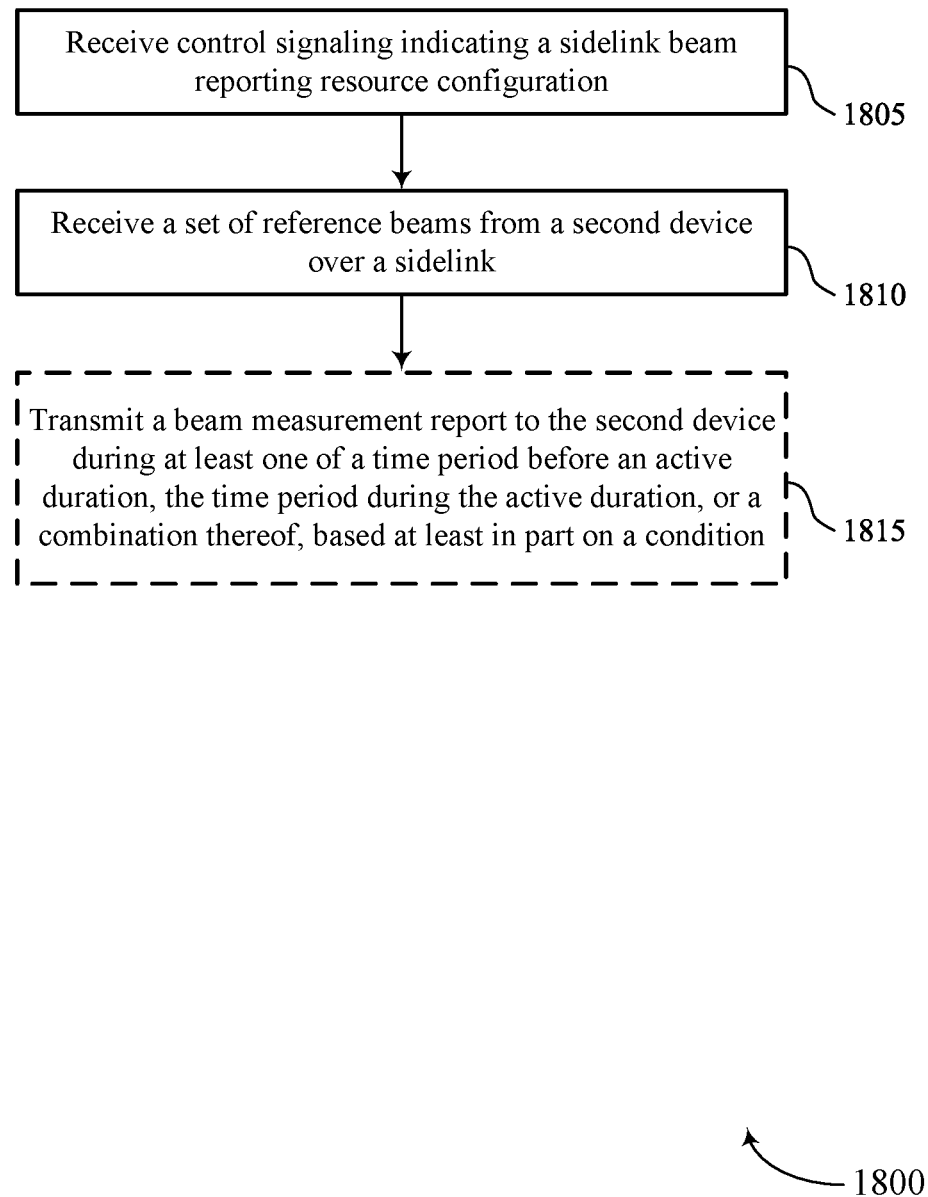

FIG. 18 shows a flowchart illustrating a method 1800 that supports techniques for beam measurement reporting in accordance with one or more aspects of the present disclosure. The operations of the method 1800 may be implemented by one or more of a base station 105 or a UE 115 or its components as described herein. For example, the operations of the method 1800 may be performed by one or more of a base station 105 or a UE 115 as described with reference to FIGS. 1 through 13. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1805, the method may include receiving control signaling indicating a sidelink beam reporting resource configuration. The operations of 1805 may be performed in accordance with examples as disclosed herein. In some examples, aspects of the operations of 1805 may be performed by a configuration component 1225 as described with reference to FIG. 12.

At 1810, the method may include receiving a set of reference beams from a second device over a sidelink. The operations of 1810 may be performed in accordance with examples as disclosed herein. In some examples, aspects of the operations of 1810 may be performed by a beam component 1230 as described with reference to FIG. 12.

At 1815, the method may include transmitting a beam measurement report to the second device during at least one of a time period before an active duration, the time period during the active duration, or a combination thereof, based at least in part on a condition. The operations of 1815 may be performed in accordance with examples as disclosed herein. In some examples, aspects of the operations of 1815 may be performed by a report component 1235 as described with reference to FIG. 12.

Figure 19:
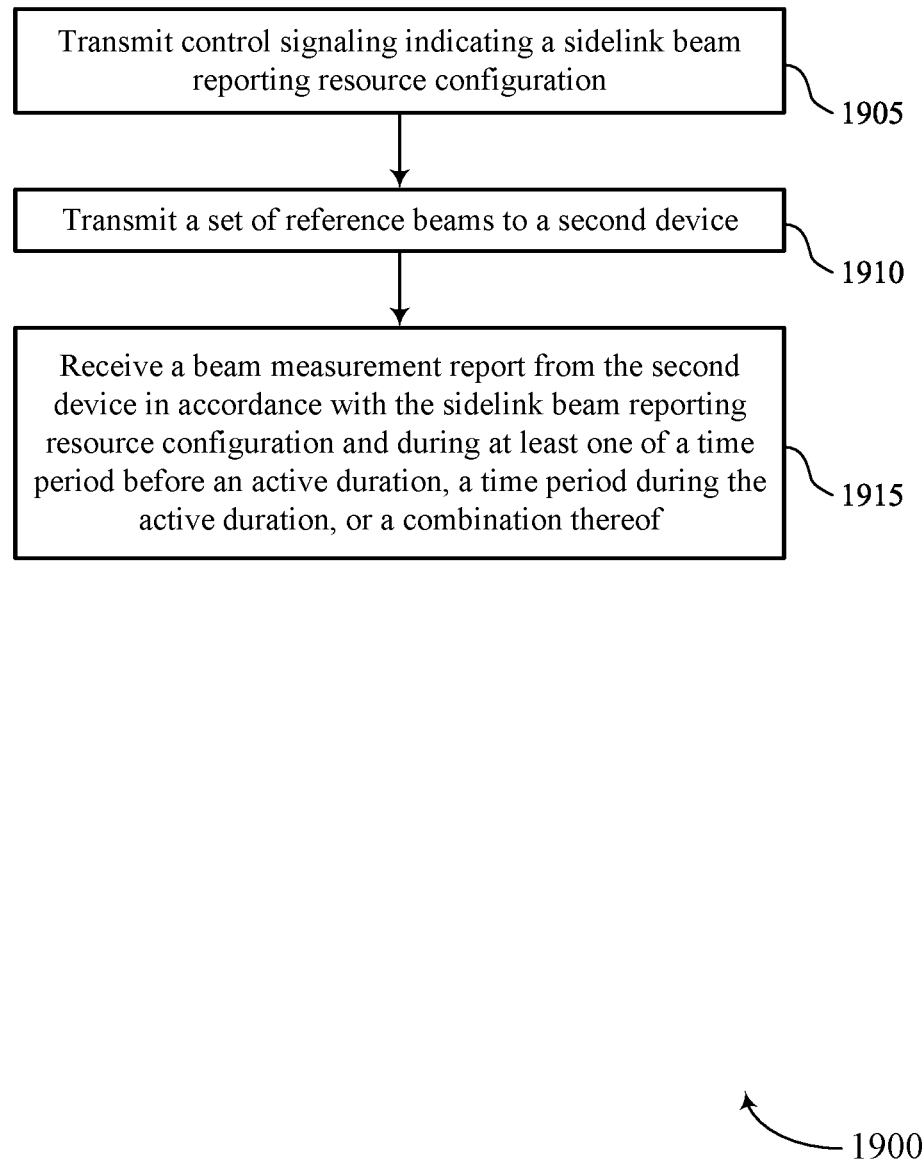

FIG. 19 shows a flowchart illustrating a method 1900 that supports techniques for beam measurement reporting in accordance with one or more aspects of the present disclosure. The operations of the method 1900 may be implemented by one or more of a base station 105 or a UE 115 or its components as described herein. For example, the operations of the method 1900 may be performed by one or more of a base station 105 or a UE 115 as described with reference to FIGS. 1 through 13. In some examples, one or more of a base station 105 or a UE 115 may execute a set of instructions to control the functional elements of one or more of the base station 105 or the UE 115 to perform the described functions. Additionally or alternatively, one or more of a base station 105 or a UE 115 may perform aspects of the described functions using special-purpose hardware.

At 1905, the method may include transmitting control signaling indicating a sidelink beam reporting resource configuration. The operations of 1905 may be performed in accordance with examples as disclosed herein. In some examples, aspects of the operations of 1905 may be performed by a configuration component 1225 as described with reference to FIG. 12.

At 1910, the method may include transmitting a set of reference beams to a second device. The operations of 1910 may be performed in accordance with examples as disclosed herein. In some examples, aspects of the operations of 1910 may be performed by a beam component 1230 as described with reference to FIG. 12.

At 1915, the method may include receiving a beam measurement report from the second device in accordance with the sidelink beam reporting resource configuration and during at least one of a time period before an active duration, a time period during the active duration, or a combination thereof. The operations of 1915 may be performed in accordance with examples as disclosed herein. In some examples, aspects of the operations of 1915 may be performed by a report component 1235 as described with reference to FIG. 12.

The following provides an overview of aspects of the present disclosure:

Aspect 1: A method for wireless communication at a first device, comprising: receiving control signaling indicating a sidelink beam reporting resource configuration; receiving a set of reference beams from a second device over a sidelink; and transmitting a beam measurement report to the second device in accordance with the sidelink beam reporting resource configuration, the beam measurement report being transmitted during at least one of a time period before an active duration, a time period during the active duration, or a combination thereof, the beam measurement report based at least in part on a set of beam measurements associated with the set of reference beams.

Aspect 2: The method of aspect 1, further comprising: determining a set of sidelink resources based at least in part on the sidelink beam reporting resource configuration; and transmitting the beam measurement report to the second device on the set of sidelink resources.

Aspect 3: The method of any of aspects 1 through 2, further comprising: performing the set of beam measurements based at least in part on a beam measurement occasion during at least one of the time period before the active duration; and transmitting, in response to the set of beam measurements, the beam measurement report to the second device based at least in part on a beam report occasion during at least one of the time period before the active duration.

Aspect 4: The method of aspect 3, wherein the beam measurement occasion and the beam report occasion are contiguous in a time domain.

Aspect 5: The method of any of aspects 3 through 4, wherein the beam measurement occasion and the beam report occasion are noncontiguous in a time domain.

Aspect 6: The method of any of aspects 1 through 5, wherein one or more of a beam measurement occasion or a beam report occasion occur during at least one of the time period before the active duration, the time period during the active duration, or a combination thereof.

Aspect 7: The method of any of aspects 1 through 6, further comprising: grouping a set of beam measurement reports associated with a set of devices including one or more of the first device or the second device; generating the beam measurement report based at least in part on the grouping of the set of beam measurement reports associated with the set of devices; and transmitting the beam measurement report to the set of devices over the sidelink based at least in part on a beam report occasion during at least one of the time period before the active duration, the time period during the active duration, or a combination thereof.

Aspect 8: The method of any of aspects 1 through 7, further comprising: transmitting a set of beam measurement reports associated with a set of devices including one or more of the first device or the second device over the sidelink based at least in part on a set of beam report occasions during at least one of the time period before the active duration, the time period during the active duration, or a combination thereof.

Aspect 9: The method of any of aspects 1 through 8, further comprising: performing the set of beam measurements based at least in part on a beam measurement occasion during at least one of the time period before the active duration, the time period during the active duration, or a combination thereof; and transmitting, in response to the set of beam measurements, the beam measurement report to the second device based at least in part on a beam report occasion during at least one of the time period during the active duration.

Aspect 10: The method of any of aspects 1 through 9, further comprising: transmitting, in response to a contention procedure to access the sidelink, the beam measurement report to the second device based at least in part on a beam report occasion during at least one of the time period before the active duration, the time period during the active duration, or a combination thereof.

Aspect 11: The method of any of aspects 1 through 10, further comprising: transmitting the beam measurement report to the second device during at least one of the time period before the active duration, the time period during the active duration, or a combination thereof, based at least in part on a condition.

Aspect 12: The method of aspect 11, further comprising: determining a first beam quality of a first beam and a second beam quality of a second beam based at least in part on the set of beam measurements, the first beam comprising a current beam used by the first device for the wireless communication, wherein transmitting the beam measurement report to the second device in accordance with the sidelink beam reporting resource configuration and during at least one of the time period before the active duration, the time period during the active duration, or a combination thereof, is based at least in part on determining the first beam quality of the first beam and the second beam quality of the second beam.

Aspect 13: The method of aspect 12, further comprising: determining one or more of the first beam quality of the first beam or the second beam quality of the second beam satisfying a threshold, wherein transmitting the beam measurement report to the second device in accordance with the sidelink beam reporting resource configuration and during at least one of the time period before the active duration, the time period during the active duration, or a combination thereof, is based at least in part on determining one or more of the first beam quality of the first beam or the second beam quality of the second beam satisfying the threshold.

Aspect 14: The method of any of aspects 11 through 13, further comprising: determining a quantity of transmission failures between the first device and the second device satisfying a threshold, wherein transmitting the beam measurement report to the second device in accordance with the sidelink beam reporting resource configuration and during at least one of the time period before the active duration, the time period during the active duration, or a combination thereof, is based at least in part on determining the quantity of transmission failures satisfying the threshold.

Aspect 15: The method of any of aspects 11 through 14, further comprising: determining a beam failure count associated with the wireless communication satisfying a threshold, wherein transmitting the beam measurement report to the second device in accordance with the sidelink beam reporting resource configuration and during at least one of the time period before the active duration, the time period during the active duration, or a combination thereof, is based at least in part on determining the beam failure count associated with the wireless communication satisfying the threshold.

Aspect 16: The method of any of aspects 11 through 15, further comprising: receiving a request for the beam measurement report from the second device or a third device, the second device comprising a user equipment and the third device comprising a base station, wherein transmitting the beam measurement report to the second device in accordance with the sidelink beam reporting resource configuration and during at least one of the time period before the active duration, the time period during the active duration, or a combination thereof, is based at least in part on receiving the request for the beam measurement report.

Aspect 17: The method of any of aspects 1 through 16, further comprising: receiving a grant allocating a set of sidelink resources for transmitting the beam measurement report to the second device during at least one of the time period before the active duration, the time period during the active duration, or a combination thereof.

Aspect 18: The method of any of aspects 1 through 17, further comprising: performing a contention procedure associated with a sidelink for a set of sidelink resources for transmitting the beam measurement report to the second device during at least one of the time period before the active duration, the time period during the active duration, or a combination thereof, wherein transmitting the beam measurement report to the second device in accordance with the sidelink beam reporting resource configuration and during at least one of the time period before the active duration, the time period during the active duration, or a combination thereof, is based at least in part on performing the contention procedure associated with the sidelink for the set of sidelink resources.

Aspect 19: The method of any of aspects 1 through 18, wherein the first device comprises a first user equipment and the second device comprises a second user equipment or a base station, the first device comprising an antenna or an antenna array.

Aspect 20: A method for wireless communication at a first device, comprising: transmitting control signaling indicating a sidelink beam reporting resource configuration; transmitting a set of reference beams to a second device; and receiving a beam measurement report from the second device in accordance with the sidelink beam reporting resource configuration and during at least one of a time period before an active duration, a time period during the active duration, or a combination thereof.

Aspect 21: The method of aspect 20, wherein one or more of a beam measurement occasion or a beam report occasion occurs during at least one of the time period before the active duration, the time period during the active duration, or a combination thereof.

Aspect 22: The method of any of aspects 20 through 21, further comprising: receiving the beam measurement report from the second device based at least in part on a beam report occasion during at least one of the time period before the active duration.

Aspect 23: The method of any of aspects 20 through 22, further comprising: receiving the beam measurement report from the second device based at least in part on a beam report occasion during at least one of the time period during the active duration.

Aspect 24: The method of any of aspects 20 through 23, wherein the first device comprises a first user equipment and the second device comprises a second user equipment or a base station, the first device comprising an antenna or an antenna array.

Aspect 25: An apparatus for wireless communication at a first device, comprising a processor; memory coupled with the processor; and instructions stored in the memory and executable by the processor to cause the apparatus to perform a method of any of aspects 1 through 19.

Aspect 26: An apparatus for wireless communication at a first device, comprising at least one means for performing a method of any of aspects 1 through 19.

Aspect 27: A non-transitory computer-readable medium storing code for wireless communication at a first device, the code comprising instructions executable by a processor to perform a method of any of aspects 1 through 19.

Aspect 28: An apparatus for wireless communication at a first device, comprising a processor; memory coupled to the processor, the processor and memory configured to cause the apparatus to perform a method of any of aspects 20 through 24.

Aspect 29: An apparatus for wireless communication at a first device, comprising at least one means for performing a method of any of aspects 20 through 24.

Aspect 30: A non-transitory computer-readable medium storing code for wireless communication at a first device, the code comprising instructions executable by a processor to perform a method of any of aspects 20 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
    one or more memories; and
    one or more processors coupled with the one or more memories and configured to cause the first device to:
        receive control signaling indicative of a sidelink beam reporting resource configuration;
        receive a set of reference beams from a second device over a sidelink; and
        transmit a beam measurement report to the second device in accordance with the sidelink beam reporting resource configuration, wherein the beam measurement report is transmitted during at least one of a time period before an active duration, a time period during the active duration, or a combination thereof, wherein the beam measurement report is based at least in part on a set of beam measurements associated with the set of reference beams, wherein the set of beam measurements is based at least in part on a sidelink discontinuous reception offset duration before the active duration, wherein the sidelink discontinuous reception offset duration is within an inactive duration, and wherein the active duration is associated with a power savings mode.

2. The apparatus of claim 1, wherein the one or more processors are further configured to cause the first device to:
    determine a set of sidelink resources based at least in part on the sidelink beam reporting resource configuration; and
    transmit the beam measurement report to the second device on the set of sidelink resources.

3. The apparatus of claim 1, wherein the one or more processors are further configured to cause the first device to:
    perform the set of beam measurements based at least in part on a beam measurement occasion during at least one of the time period before the active duration; and
    transmit, in response to the set of beam measurements, the beam measurement report to the second device based at least in part on a beam report occasion during at least one of the time period before the active duration.

4. The apparatus of claim 3, wherein the beam measurement occasion and the beam report occasion are contiguous in a time domain.

5. The apparatus of claim 3, wherein the beam measurement occasion and the beam report occasion are noncontiguous in a time domain.

6. The apparatus of claim 1, wherein one or more of a beam measurement occasion or a beam report occasion occur during at least one of the time period before the active duration, the time period during the active duration, or a combination thereof.

7. The apparatus of claim 1, wherein the one or more processors are further configured to cause the first device to:

group a set of beam measurement reports associated with a set of devices, wherein the set of devices includes one or more of the first device or the second device;
generate the beam measurement report based at least in part on the grouped set of beam measurement reports associated with the set of devices; and
transmit the beam measurement report to the set of devices over the sidelink based at least in part on a beam report occasion during at least one of the time period before the active duration, the time period during the active duration, or a combination thereof.

8. The apparatus of claim 1, wherein the one or more processors are further configured to cause the first device to:
transmit a set of beam measurement reports associated with a set of devices, wherein the set of devices includes one or more of the first device or the second device over the sidelink based at least in part on a set of beam report occasions during at least one of the time period before the active duration, the time period during the active duration, or a combination thereof.

9. The apparatus of claim 1, wherein the one or more processors are further configured to cause the first device to:
perform the set of beam measurements based at least in part on a beam measurement occasion during at least one of the time period before the active duration, the time period during the active duration, or a combination thereof; and
transmit, in response to the set of beam measurements, the beam measurement report to the second device based at least in part on a beam report occasion during at least one of the time period during the active duration.

10. The apparatus of claim 1, wherein the one or more processors are further configured to cause the first device to:
transmit, in response to a contention procedure to access the sidelink, the beam measurement report to the second device based at least in part on a beam report occasion during at least one of the time period before the active duration, the time period during the active duration, or a combination thereof.

11. The apparatus of claim 1, wherein the one or more processors are further configured to cause the first device to:
transmit the beam measurement report to the second device during at least one of the time period before the active duration, the time period during the active duration, or a combination thereof, based at least in part on a condition.

12. The apparatus of claim 11, wherein the one or more processors are further configured to cause the first device to:
determine a first beam quality of a first beam and a second beam quality of a second beam based at least in part on the set of beam measurements, wherein the first beam comprises a current beam used by the first device for the wireless communication, and
transmit the beam measurement report to the second device in accordance with the sidelink beam reporting resource configuration and during at least one of the time period before the active duration, the time period during the active duration, or a combination thereof, based at least in part on the first beam quality of the first beam and the second beam quality of the second beam.

13. The apparatus of claim 12, wherein the one or more processors are further configured to cause the first device to:
determine that one or more of the first beam quality of the first beam or the second beam quality of the second beam satisfies a threshold, and
transmit the beam measurement report to the second device in accordance with the sidelink beam reporting resource configuration and during at least one of the time period before the active duration, the time period during the active duration, or a combination thereof, based at least in part on the determination that the one or more of the first beam quality of the first beam or the second beam quality of the second beam satisfies the threshold.

14. The apparatus of claim 11, wherein the one or more processors are further configured to cause the first device to:
determine that a quantity of transmission failures between the first device and the second device satisfies a threshold, and
transmit the beam measurement report to the second device in accordance with the sidelink beam reporting resource configuration and during at least one of the time period before the active duration, the time period during the active duration, or a combination thereof, based at least in part on a determination that the quantity of transmission failures satisfies the threshold.

15. The apparatus of claim 11, wherein the one or more processors are further configured to cause the first device to:
determine that a beam failure count associated with the wireless communication satisfies a threshold, and
transmit the beam measurement report to the second device in accordance with the sidelink beam reporting resource configuration and during at least one of the time period before the active duration, the time period during the active duration, or a combination thereof, based at least in part on a determination that the beam failure count associated with the wireless communication satisfies the threshold.

16. The apparatus of claim 11, wherein the one or more processors are further configured to cause the first device to:
receive a request for the beam measurement report from the second device or a third device, wherein the second device comprises a user equipment and the third device comprises a base station, and
transmit the beam measurement report to the second device in accordance with the sidelink beam reporting resource configuration and during at least one of the time period before the active duration, the time period during the active duration, or a combination thereof, based at least in part on the request for the beam measurement report.

17. The apparatus of claim 1, wherein the one or more processors are further configured to cause the first device to:
receive a grant for a set of sidelink resources to transmit the beam measurement report to the second device during at least one of the time period before the active duration, the time period during the active duration, or a combination thereof.

18. The apparatus of claim 1, wherein the one or more processors are further configured to cause the first device to:
perform a contention procedure associated with a sidelink for a set of sidelink resources to transmit the beam measurement report to the second device during at least one of the time period before the active duration, the time period during the active duration, or a combination thereof, and
transmit the beam measurement report to the second device in accordance with the sidelink beam reporting resource configuration and during at least one of the time period before the active duration, the time period during the active duration, or a combination thereof, based at least in part on the contention procedure associated with the sidelink for the set of sidelink resources.

19. The apparatus of claim 1, wherein the first device comprises a first user equipment and the second device comprises a second user equipment or a base station, and wherein the first device comprises an antenna or an antenna array.

20. An apparatus for wireless communication at a first device, comprising:
one or more memories; and
one or more processors coupled with the one or more memories and configured to cause the first device to:
transmit control signaling indicative of a sidelink beam reporting resource configuration;
transmit a set of reference beams to a second device; and
receive a beam measurement report from the second device in accordance with the sidelink beam reporting resource configuration and during at least one of a time period before an active duration, a time period during the active duration, or a combination thereof, wherein a set of beam measurements associated with the beam measurement report is based at least in part on a sidelink discontinuous reception offset duration before the active duration, wherein the sidelink discontinuous reception offset duration is within an inactive duration, and wherein the active duration is associated with a power savings mode.

21. The apparatus of claim 20, wherein one or more of a beam measurement occasion or a beam report occasion occurs during at least one of the time period before the active duration, the time period during the active duration, or a combination thereof.

22. The apparatus of claim 20, wherein the one or more processors are further configured to cause the first device to:
receive the beam measurement report from the second device based at least in part on a beam report occasion during at least one of the time period before the active duration.

23. The apparatus of claim 20, wherein the one or more processors are further configured to cause the first device to:
receive the beam measurement report from the second device based at least in part on a beam report occasion associated with the time period during the active duration.

24. The apparatus of claim 20, wherein the first device comprises a first user equipment and the second device comprises a second user equipment or a base station, and wherein the first device comprises an antenna or an antenna array.

25. A method for wireless communication at a first device, comprising:
receiving control signaling indicative of a sidelink beam reporting resource configuration;
receiving a set of reference beams from a second device over a sidelink; and
transmitting a beam measurement report to the second device in accordance with the sidelink beam reporting resource configuration, wherein the beam measurement report is transmitted during at least one of a time period before an active duration, a time period during the active duration, or a combination thereof, wherein the beam measurement report is based at least in part on a set of beam measurements associated with the set of reference beams, wherein the set of beam measurements associated with the beam measurement report is based at least in part on a sidelink discontinuous reception offset duration before the active duration, wherein the sidelink discontinuous reception offset duration is within an inactive duration, and wherein the active duration is associated with a power savings mode.

26. The method of claim 25, further comprising:
determining a set of sidelink resources based at least in part on the sidelink beam reporting resource configuration; and
transmitting the beam measurement report to the second device on the set of sidelink resources.

27. The method of claim 25, further comprising:
performing the set of beam measurements based at least in part on a beam measurement occasion during at least one of the time period before the active duration; and
transmitting, in response to the set of beam measurements, the beam measurement report to the second device based at least in part on a beam report occasion during at least one of the time period before the active duration.

28. A method for wireless communication at a first device, comprising:
transmitting control signaling indicative of a sidelink beam reporting resource configuration;
transmitting a set of reference beams to a second device; and
receiving a beam measurement report from the second device in accordance with the sidelink beam reporting resource configuration and during at least one of a time period before an active duration, a time period during the active duration, or a combination thereof, wherein a set of beam measurements associated with the beam measurement report is based at least in part on a sidelink discontinuous reception offset duration before the active duration, wherein the sidelink discontinuous reception offset duration is within an inactive duration, and wherein the active duration is associated with a power savings mode.

29. The method of claim 28, wherein one or more of a beam measurement occasion or a beam report occasion occurs during at least one of the time period before the active duration, the time period during the active duration, or a combination thereof.

30. The method of claim 28, further comprising:
receiving the beam measurement report from the second device based at least in part on a beam report occasion associated with the time period before the active duration.

31. A non-transitory computer-readable medium storing code for wireless communication at a first device, the code comprising instructions executable by one or more processors to cause the first device to:
receive control signaling indicative of a sidelink beam reporting resource configuration;
receive a set of reference beams from a second device over a sidelink; and
transmit a beam measurement report to the second device in accordance with the sidelink beam reporting resource configuration, wherein the beam measurement report is transmitted during at least one of a time period before an active duration, a time period during the active duration, or a combination thereof, wherein the beam measurement report is based at least in part on a set of beam measurements associated with the set of reference beams, wherein the set of beam measurements is based at least in part on a sidelink discontinuous reception offset duration before the active duration, wherein the sidelink discontinuous reception offset duration is within an inactive duration, and wherein the active duration is associated with a power savings mode.

32. The non-transitory computer-readable medium of claim 31, wherein the instructions are further executable by the one or more processors to cause the first device to:
determine a set of sidelink resources based at least in part on the sidelink beam reporting resource configuration; and
transmit the beam measurement report to the second device on the set of sidelink resources.

33. The non-transitory computer-readable medium of claim 31, wherein the instructions are further executable by the one or more processors to cause the first device to:
perform the set of beam measurements based at least in part on a beam measurement occasion during at least one of the time period before the active duration; and
transmit, in response to the set of beam measurements, the beam measurement report to the second device based at least in part on a beam report occasion during at least one of the time period before the active duration.

34. A non-transitory computer-readable medium storing code for wireless communication at a first device, the code comprising instructions executable by one or more processors to cause the first device to:
transmit control signaling indicative of a sidelink beam reporting resource configuration;
transmit a set of reference beams to a second device; and
receive a beam measurement report from the second device in accordance with the sidelink beam reporting resource configuration and during at least one of a time period before an active duration, a time period during the active duration, or a combination thereof, wherein a set of beam measurements associated with the beam measurement report is based at least in part on a sidelink discontinuous reception offset duration before the active duration, wherein the sidelink discontinuous reception offset duration is within an inactive duration, and wherein the active duration is associated with a power savings mode.

35. The non-transitory computer-readable medium of claim 34, wherein one or more of a beam measurement occasion or a beam report occasion occurs during at least one of the time period before the active duration, the time period during the active duration, or a combination thereof.

36. The non-transitory computer-readable medium of claim 34, wherein the instructions are further executable by the one or more processors to cause the first device to:
receive the beam measurement report from the second device based at least in part on a beam report occasion during at least one of the time period before the active duration.

* * * * *